(12) United States Patent
Yasuda et al.

(10) Patent No.: US 11,547,051 B2
(45) Date of Patent: Jan. 10, 2023

(54) HYDROSTATIC TRANSAXLE

(71) Applicant: KANZAKI KOKYUKOKI MFG. CO., LTD., Amagasaki (JP)

(72) Inventors: Toshifumi Yasuda, Amagasaki (JP); Hiroshi Sugimoto, Amagasaki (JP); Daisuke Murashima, Amagasaki (JP); Masaru Iida, Amagasaki (JP); Koji Iwaki, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 1076 days.

(21) Appl. No.: 16/191,063

(22) Filed: Nov. 14, 2018

(65) Prior Publication Data

US 2019/0141898 A1 May 16, 2019

Related U.S. Application Data

(60) Provisional application No. 62/586,563, filed on Nov. 15, 2017.

(51) Int. Cl.
| | |
|---|---|
| *A01D 69/03* | (2006.01) |
| *A01D 69/06* | (2006.01) |
| *F16H 7/02* | (2006.01) |
| *B60K 17/04* | (2006.01) |
| *B60K 17/10* | (2006.01) |

(Continued)

(52) U.S. Cl.
CPC ............ *A01D 69/03* (2013.01); *A01D 69/06* (2013.01); *B60K 17/046* (2013.01); *B60K 17/105* (2013.01); *F16H 7/02* (2013.01); *B60K 2007/0092* (2013.01); *F16D 2121/16* (2013.01); *F16H 39/14* (2013.01)

(58) Field of Classification Search
CPC ........... A01D 69/03; F16H 7/02; F16H 39/14; B60K 17/04; B60K 17/043; B60K 17/105; B60K 2007/038; B60K 2007/069; B60K 2007/092; B60K 7/0015; B60Y 2200/223
See application file for complete search history.

(56) References Cited

U.S. PATENT DOCUMENTS

| | | |
|---|---|---|
| 7,798,259 B2 | 9/2010 | Iida et al. |
| 9,964,126 B2 * | 5/2018 | Murashima ......... F16H 63/3416 |

(Continued)

FOREIGN PATENT DOCUMENTS

JP      2007-153130 A      6/2007

*Primary Examiner* — Jacob D Knutson
*Assistant Examiner* — Maurice L Williams
(74) *Attorney, Agent, or Firm* — Sterne, Kessler, Goldstein & Fox, P.L.L.C.

(57) ABSTRACT

A hydrostatic transaxle includes: a casing that is provided with an openable and closable filter insertion port and is filled with hydraulic oil; a hydraulic continuously variable transmission that is arranged inside the casing; a filter holding member that includes a support base that is a hollow cylindrical portion and oil-tightly partitions an inside of a cylinder and an outside of the cylinder, and a filter connection port that is a hollow cylindrical portion extending from a peripheral side surface of the support base and communicating with the inside of the cylinder, the support base communicating the inside of the cylinder to the port, and arranged between the center section and the casing facing the port; and a filter body that is freely inserted to and removed from the casing via the filter insertion port.

8 Claims, 21 Drawing Sheets

(51) Int. Cl.
*B60K 7/00* (2006.01)
*F16H 39/14* (2006.01)
F16D 121/16 (2012.01)

(56) References Cited

U.S. PATENT DOCUMENTS

| | | | | |
|---|---|---|---|---|
| 10,670,127 B2* | 6/2020 | Sugimoto | ................ | F16H 47/02 |
| 2015/0007555 A1* | 1/2015 | Saldierna | ............ | F16H 61/0003 |
| | | | | 60/419 |
| 2015/0075155 A1* | 3/2015 | Murashima | ............ | B60K 17/10 |
| | | | | 60/487 |
| 2016/0298743 A1* | 10/2016 | Yasuda | ............... | F16H 57/0457 |

* cited by examiner (A)

(B)

(A)

(B)

HYDROSTATIC TRANSAXLE

CROSS REFERENCE TO RELATED APPLICATION

This application claims priority to U.S. Provisional Application No. 62/586,563, filed on Nov. 15, 2017, the disclosure of which is hereby incorporated by reference in its entirety.

BACKGROUND OF THE INVENTION

(1) Field of the Invention

At least one embodiment according to the present invention relates to a hydrostatic transaxle.

(2) Description of Related Art

As disclosed in, for example, JP-A 2007-153130 Gazette, a conventional hydrostatic transaxle is known which includes: a continuously variable transmission; a reduction gear train; an oil filter for filtering hydraulic oil to be supplied to the continuously variable transmission; and the like.

The hydrostatic transaxle as described above has a configuration in which a lid for attachment and detachment of the filter receives a base of a spring with which a charge pressure of a floating charge pump is determined.

For this reason, in the hydrostatic transaxle having the above-described configuration, when the lid for attachment and detachment of the filter is removed, the charge pump falls off by its own weight. Therefore, when the lid is set after filter exchange, it is necessary to reassemble the charge pump, and it is also necessary to close the lid while compressing the spring. This makes exchange work of the oil filter difficult. In the hydrostatic transaxle having the configuration described above, there is also a problem that a setting pressure of the charge pump changes depending on tightness of a bolt fastening the lid.

SUMMARY OF THE INVENTION

At least one embodiment of the present application provides a hydrostatic transaxle capable of facilitating oil filter exchange.

In order to achieve the matter described above, the hydrostatic transaxle includes: a casing that is provided with an openable and closable filter insertion port and is filled with hydraulic oil; a hydraulic continuously variable transmission that is arranged inside the casing, the hydraulic continuously variable transmission including in combination a hydraulic pump, a hydraulic motor, and a center section provided with a closed circuit for fluidly connecting the hydraulic pump and the hydraulic motor, and including a port for charging the hydraulic oil in the closed circuit; a filter holding member that includes a support base that is a hollow cylindrical portion and oil-tightly partitions an inside of a cylinder and an outside of the cylinder, and a filter connection port that is a hollow cylindrical portion extending from a peripheral side surface of the support base and communicating with the inside of the cylinder, the support base communicating the inside of the cylinder to the port, and arranged between the center section and the casing facing the port, the filter connection port arranged so that a terminal end opening portion of the filter connection port faces the filter insertion port of the casing; and a filter body that is freely inserted to and removed from the casing via the filter insertion port, and is coupled to and held by the filter connection port when inserted to a predetermined position in the casing from the filter insertion port.

In order to achieve the matter described above, the support base of the hydrostatic transaxle includes a filter portion capable of filtering the hydraulic oil.

In order to achieve the matter described above, the hydrostatic transaxle includes a filter cap that enables opening and closing of the filter insertion port, and includes, between the filter cap and the filter body, an energizing member that energizes the filter body to the filter connection port side.

In order to achieve the matter described above, the hydrostatic transaxle includes a floating type charge pump contained in the support base of the filter holding member.

In order to achieve the matter described above, in the hydrostatic transaxle, the casing includes a single axle driven by the hydraulic motor, and the filter insertion port is arranged in a side to which the axle does not project among both side walls of the casing.

In order to achieve the matter described above, in the hydrostatic transaxle, the hydraulic motor is arranged between the pump and the axle, the hydraulic motor being arranged so that a rotation axis of the hydraulic motor is perpendicular to a longitudinal direction of the axle in a plan view and is V-shaped with respect to the rotation axis of the pump in a side view, and the filter body is located in a dead space between the motor and the axle.

In order to achieve the matter described above, the hydrostatic transaxle includes a casing that is provided with an openable and closable filter insertion port and is filled with hydraulic oil; a hydraulic continuously variable transmission that is arranged inside the casing, the hydraulic continuously variable transmission including in combination a hydraulic pump, a hydraulic motor, and a center section provided with a closed circuit for fluidly connecting the hydraulic pump and the hydraulic motor, and including a port for charging the hydraulic oil in the closed circuit; a filter holding member in which a filter connection port that is a hollow cylindrical portion is arranged so that a terminal end opening portion of the filter connection port faces the filter insertion port of the casing; and a filter body that is freely inserted to and removed from the casing via the filter insertion port, and is coupled to and held by the filter connection port when inserted to a predetermined position in the casing from the filter insertion port. The hydraulic continuously variable transmission includes a charge pump for charging the hydraulic oil in the port of the closed circuit. The casing includes a single axle driven by the hydraulic motor, and the filter insertion port is arranged in a side to which the axle does not project among both side walls of the casing. The hydraulic motor is arranged between the pump and the axle, the hydraulic motor being arranged so that a rotation axis of the hydraulic motor is perpendicular to a longitudinal direction of the axle in a plan view and is V-shaped with respect to the rotation axis of the pump in a side view. The filter body is located in a dead space between the motor and the axle, and the filter holding member is arranged along an inner wall of the casing and connected to a suction side of the charge pump.

In order to achieve the matter described above, the casing of the hydrostatic transaxle includes a pair of external port openings which are opened to the outside, and a first external port communicating with the discharge side of the charge pump and a second external port communicating with the oil suction side of the charge pump, the first external port and the second external port communicating with the outside of the casing through the pair of external port openings. The first external port and the second external port are provided on a surface different from a surface on which the filter insertion port is provided in the casing.

The hydrostatic transaxle having the configuration as described above is advantageous in that the filter body can be easily exchanged.

These and other features and effects will become apparent from the following detailed description of the invention with reference to the accompanying drawings.

BRIEF DESCRIPTION OF THE DRAWINGS

Some embodiments will be described with reference to the accompanying drawings, but the embodiments and the drawings are merely examples and are not limiting. In some drawings, the same reference numerals are given to the same elements.

FIG. 11A is a first perspective schematic view, and FIG. 11B is a second perspective schematic view.

FIG. 12A is a first schematic perspective view, and FIG. 12B is a second schematic perspective view.

DETAILED DESCRIPTION OF PREFERRED EMBODIMENTS

First, a lawn mower that is a work vehicle equipped with a hydrostatic transaxle according to an embodiment of the present invention, will be described with reference to FIG. 1. In the following description, description will be made by defining a back and forth direction and a lateral direction with reference to a traveling direction of the lawn mower, and defining a vertical direction with reference to a vehicle body of the lawn mower arranged on a horizontal surface. The same applies to the other drawings.

Figure 1:
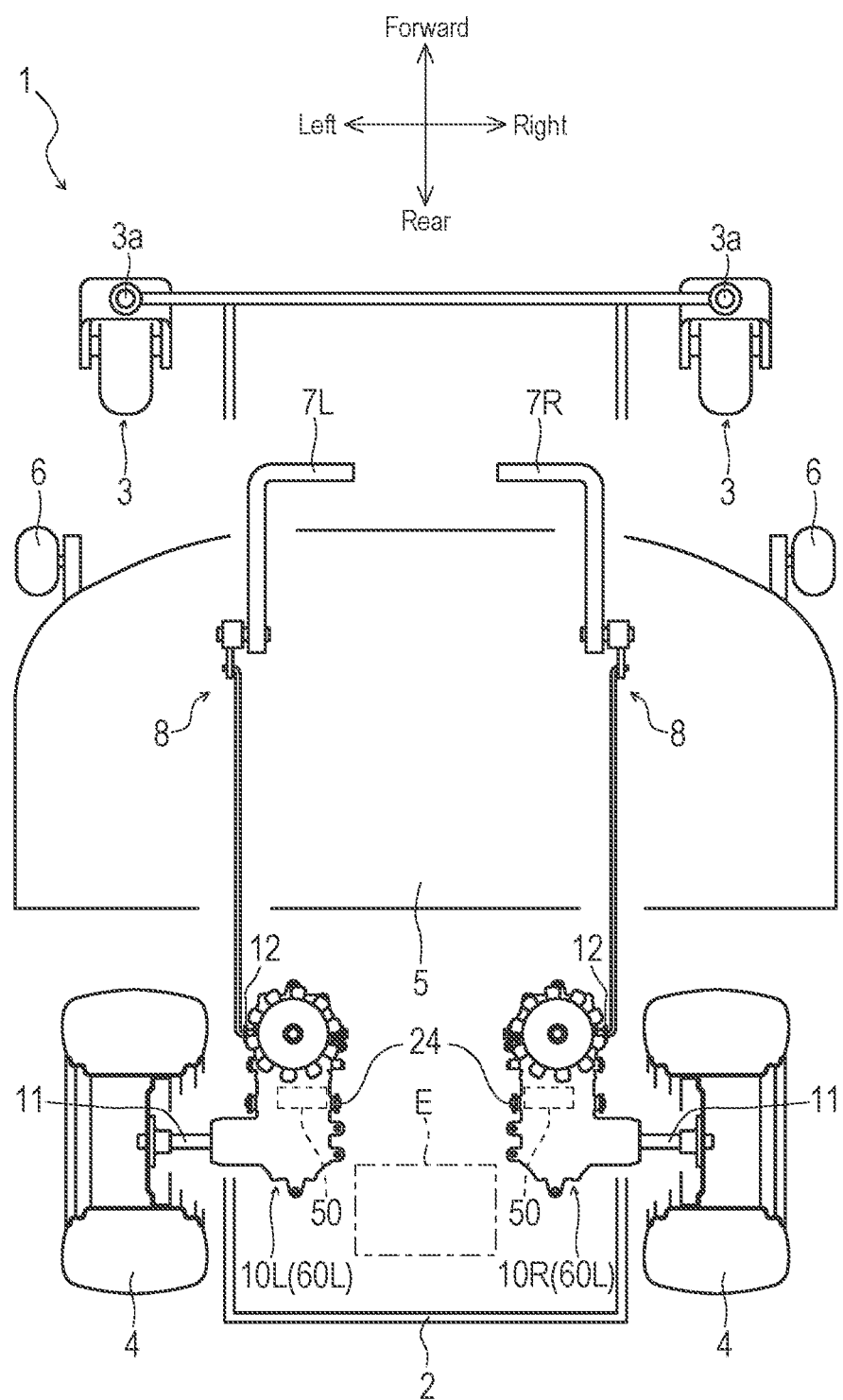
FIG. 1 is a schematic plan view showing an overall configuration of a work vehicle (lawn mower) including a hydrostatic transaxle according to an embodiment of the present invention.

As shown in FIG. 1, a lawn mower 1 serving as a work vehicle equipped with a hydrostatic transaxle according to an embodiment of the present invention is a zero turn radius (ZTR) type riding lawn mower on which an operator can ride to perform lawn mowing work, and includes a vehicle frame 2 having a substantially rectangular shape in plan view and constituting a base of a vehicle body.

The lawn mower 1 includes a pair of right and left caster wheels 3, 3 in a front end portion of the vehicle frame 2. The lawn mower 1 includes a pair of right and left hydrostatic transaxles 10, 10 in a rear end portion of the vehicle frame 2, and includes a pair of right and left rear wheels 4, 4 fixed on axles 11, 11 driven to rotate by the hydrostatic transaxles 10, 10. Hereinafter, the hydrostatic transaxle 10 arranged in a left side of the lawn mower 1 is also referred to as a hydrostatic transaxle 10L, and the hydrostatic transaxle 10 arranged in a right side of the lawn mower 1 is also referred to as a hydrostatic transaxle 10R.

The lawn mower 1 includes a mower 5 in a center upper portion of the vehicle frame 2, and includes a driver's seat (not shown) in an upper portion of the mower 5. The mower 5 includes a pair of right and left auxiliary wheels 6, 6.

As shown in FIG. 1, the lawn mower 1 includes a pair of right and left operation levers 7, 7 that are rotatable in a back and forth direction so as to enable adjustment of the travel direction and traveling speed in a right and left sides of the driver's seat. Hereinafter, the operation lever 7 arranged in the left side of the lawn mower 1 is also referred to as an operation lever 7L, and the operation lever 7 arranged in the right side of the lawn mower 1 is also referred to as an operation lever 7R. The operation levers 7L, 7R are interlockingly linked to shift levers 15, 15 of the hydrostatic transaxles 10L, 10R via links 8, 8, respectively. According to a forward or rearward rotation direction with reference to neutral positions of the operation levers 7L, 7R, a movable swash plate 36 (see FIG. 2, FIG. 5, and the like) of a hydraulic pump 31 built in the hydrostatic transaxle 10L or 10R corresponding to the rotation direction inclines in a forward movement side or a backward movement side. An inclination angle of the movable swash plate 36 is set according to a rotation amount of the operation lever 7L or 7R. According to the inclination direction and the inclination angle, an oil discharge direction and an oil discharge amount of the hydraulic pump 31, that is, a forward and backward rotation direction and the rotation speed of the rear wheels 4, 4 are set. Then, the lawn mower 1 turns according to a difference between rotation amounts or a difference between rotation directions of the operation levers 7L, 7R.

Here, a hydraulic drive system of the lawn mower 1 will be described.

The hydrostatic transaxles 10L, 10R included in the lawn mower 1 are devices for driving the rear wheels 4, 4 to rotate, and include a casing 20, a hydro-static transmission 30, a reduction gear train 40, an oil filter 50, and the like.

The inside of the casing 20 of each of the hydrostatic transaxles 10L, 10R is an oil reservoir, and accommodates therein: the hydro-static transmission (hereinafter, also referred to as HST) 30 fluidly connected to a variable displacement type hydraulic pump 31 and a fixed displacement type hydraulic motor 32 via a closed circuit (a pair of oil passages X1, X2); the axles 11, 11; and a reduction gear train 40 for transmitting an output of the hydraulic motor 32 to the axle 11. The axle 11 of the hydrostatic transaxle 10L projects in the left side of the casing 20, the axle 11 of the hydrostatic transaxle 10R projects in the right side of the casing 20, and the rear wheels 4, 4 are attached to each outer end.

Figure 2:
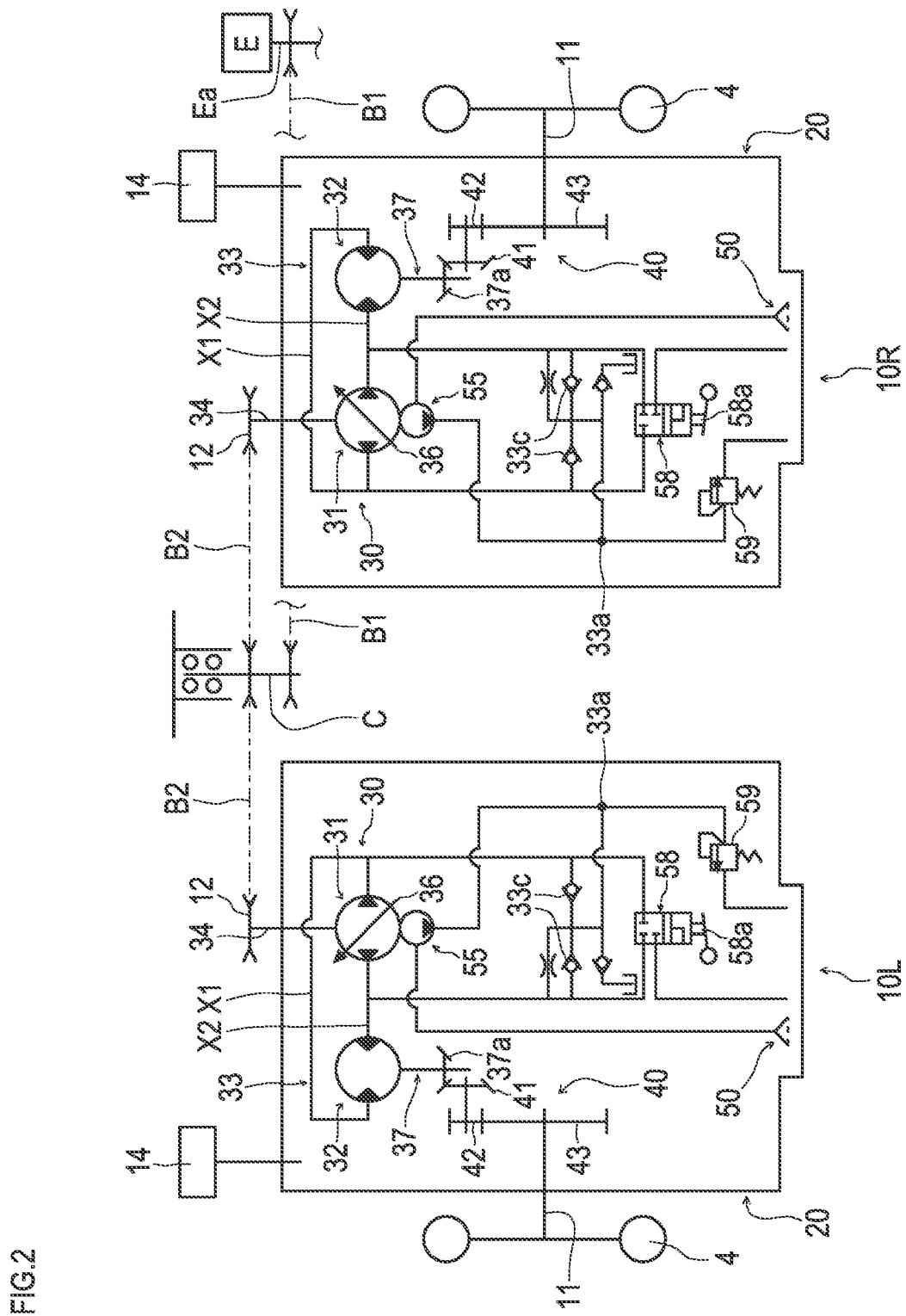
FIG. 2 is a hydraulic system diagram of the work vehicle (lawn mower) according to an embodiment of the present invention.

A pump shaft 34 is a pump shaft of the hydraulic pump 31. A traveling belt transmission mechanism from an axle output shaft Ea of an engine E to the pump shafts 34, 34 of the hydrostatic transaxles 10L, 10R is configured by belts B1, B2, a counter shaft C, and the like, as shown in FIG. 2.

The HST 30 in the casing 20 is configured by fluidly connecting the hydraulic pump 31 and the hydraulic motor 32 with a pair of oil passages X1, X2. The HST 30 shown in FIG. 2 includes a floating type charge pump 55 driven by the rotation of the pump shaft 34 together with the hydraulic pump 31. It should be noted that the charge pump 55 can be eliminated when the hydrostatic transaxle 10 is configured to compatible with a light load, and can be changed to a self-suction type.

The hydrostatic transaxles 10L, 10R have a configuration in which the charge pump 55 sucks hydraulic oil from the oil reservoir in the casing 20 via the oil filter 50. The discharged oil is adjusted by a charge relief valve 59, and is supplied to a closed circuit (low pressure side of the pair of oil passages X1, X2) between the hydraulic pump 31 and the hydraulic motor 32 of the HSTs 30, 30 via charge check valves 33k, 33k. The relief oil from the charge relief valve 59 is returned to the oil reservoir.

In each of the casings 20, the charge check valve 33k for the oil passage X2 that is a high pressure side at the time of backward movement, is connected to the oil passage X2 in parallel to a neutral expansion oil passage via an orifice, and returns the pressurized oil in the oil passage X2 to the upstream side of the charge check valves 33k, 33k via the orifice at the time of backward movement.

When the upstream side of the charge check valves 33k, 33k is connected to the oil reservoir via a free wheel check valve, and the oil passage X1 or X2 has a negative pressure at the time the engine E is stopped, the check valve opens to self-suction the oil in the oil reservoir so that the inside of the closed circuit is always filled with oil. This check valve is provided in order to avoid a situation where the hydraulic motor 32 rotates together with the rear wheel 4 at the time of parking on a slope.

A bypass valve 58 is disposed in each of the closed circuits in order to enable the hydraulic motor 32 to rotate together with the rear wheel 4 at the time of towing of the vehicle or the like. The bypass valve 58 is configured to be switchable between a valve-opening position and a valve-closing position by manual operation (operation of a bypass lever 58a). The bypass valve 58 is normally configured to be set to the valve-closing position, and is set to the valve-opening position as necessary, so that the hydraulic oil is merged from the oil passages X1, X2 and is returned to the oil reservoir of the casing 20. With such a configuration, pump action of the hydraulic motor 32 is permitted within the oil passages X1, X2, and the hydraulic motor 32 can rotate together with the rear wheel 4.

Next, the hydrostatic transaxle 10 that is a hydrostatic transaxle according to a first embodiment of the present invention will be described in more detail with reference to FIGS. 1 to 5.

As shown in FIG. 1, a pair of right and left hydrostatic transaxles 10L, 10R provided in the lawn mower 1 has a shape that is line-symmetrical with each other, and although shapes of the hydrostatic transaxles 10L, 10R are different from each other, the configuration and the like of the inside of the device are common. Thus, in the description below, the hydrostatic transaxle 10L provided in the left side of the lawn mower 1 will be described as an example, and the description of the hydrostatic transaxle 10R provided in the right side of the lawn mower 1 will be omitted.

Figure 3:
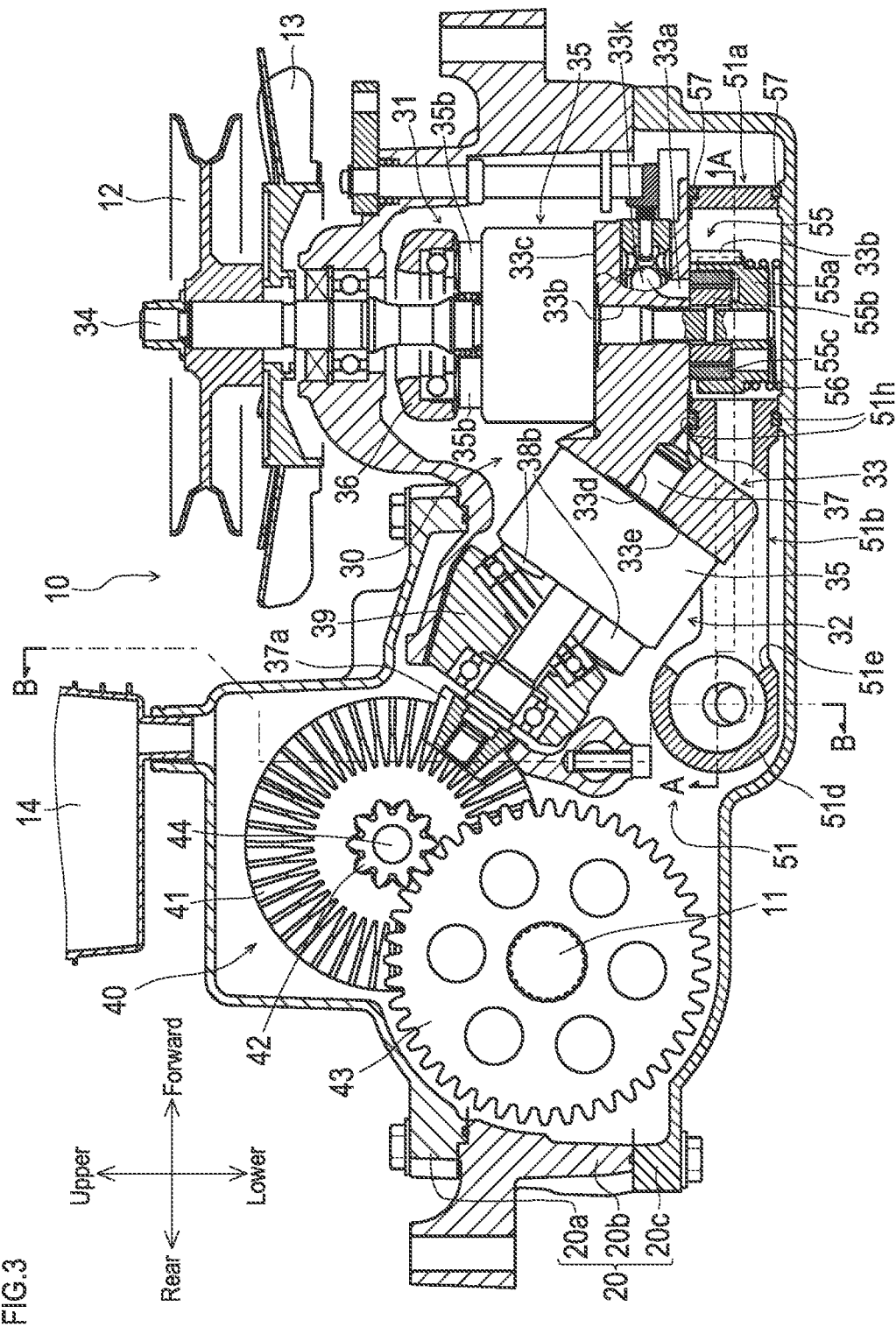
FIG. 3 is a schematic cross-sectional view of the hydrostatic transaxle according to a first embodiment of the present invention in a right side view.

As shown in FIG. 3, the hydrostatic transaxle 10L that is the hydrostatic transaxle according to the first embodiment of the present invention is a device for driving the left rear wheel 4 (see FIG. 1) of the lawn mower 1 to rotate, and includes the casing 20, the HST 30, the reduction gear train 40, the oil filter 50, and the like.

The casing 20 is a casing that covers the HST 30, the reduction gear train 40, the oil filter 50, and the like, and is configured by placing an upper casing portion 20a, a middle casing portion 20b, and a lower casing portion 20c on top of one another, and is filled with hydraulic oil in the inside. Reference numeral 14 denotes a reserve tank.

Figure 4:
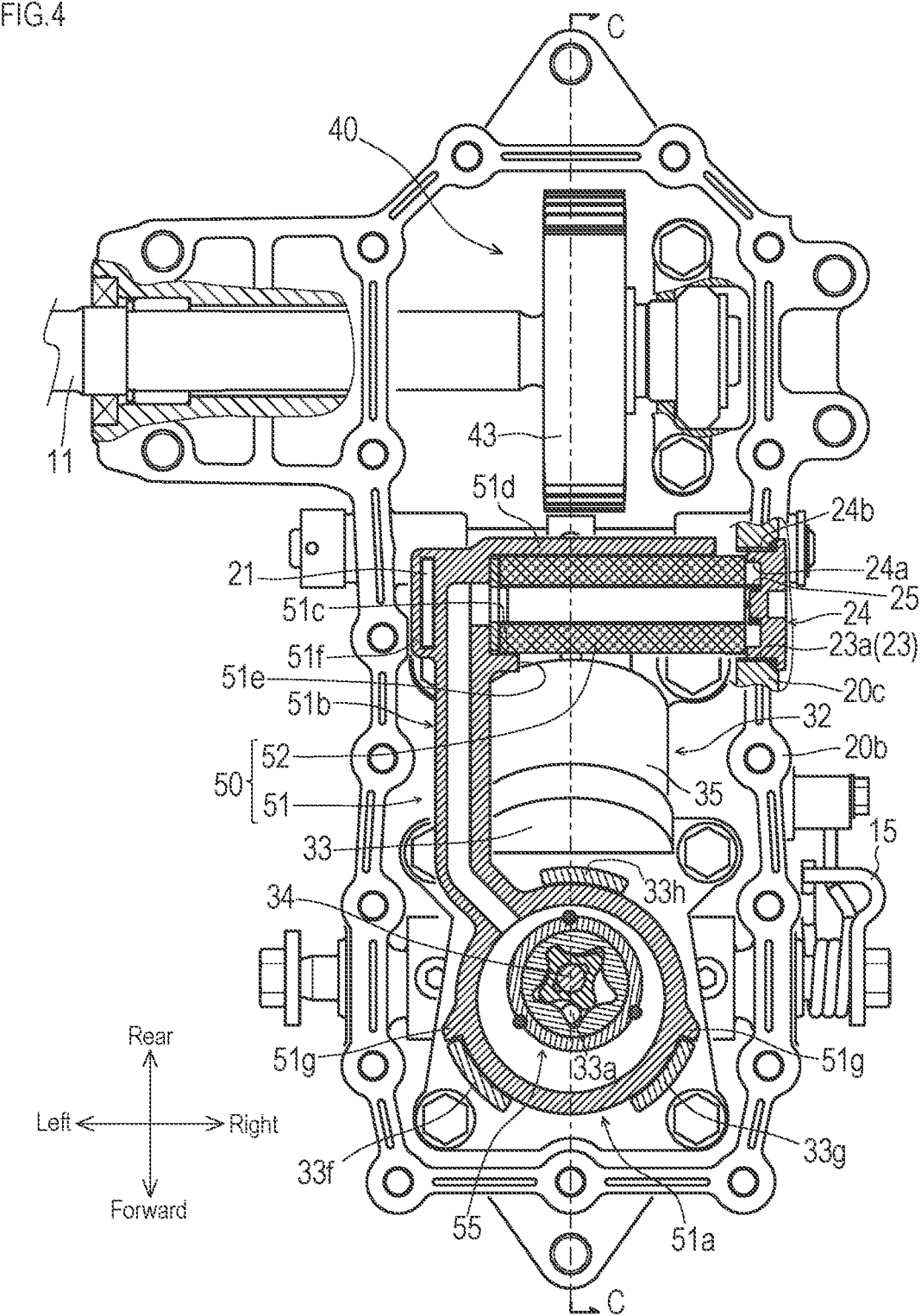
FIG. 4 is a schematic bottom view (a part of the oil filter is a cross-sectional view taken along A-A in FIG. 3) in a state in which a lower casing portion of the hydrostatic transaxle is removed according to the first embodiment of the present invention.

As shown in FIGS. 3 and 4, in the lower casing portion 20c, a filter insertion port 23 to which a filter (a filter body 52 described later) that filters the hydraulic oil is inserted and removed is formed in the right side surface opposite to the left side surface in which the axle 11 projects. The filter insertion port 23 is openable and closable by a filter cap 24 constituting a part of the casing 20.

The filter cap 24 is a lid-like member that has a cylindrical body portion 24a that can be inserted into the filter insertion port 23, and provided with a male screw 24b on an outer peripheral portion of the body portion 24a. The filter cap 24 is configured to be freely attached to and detached from the filter insertion port 23 by screwing the male screw 24b into the female screw 23a formed in the filter insertion port 23.

Figure 5:
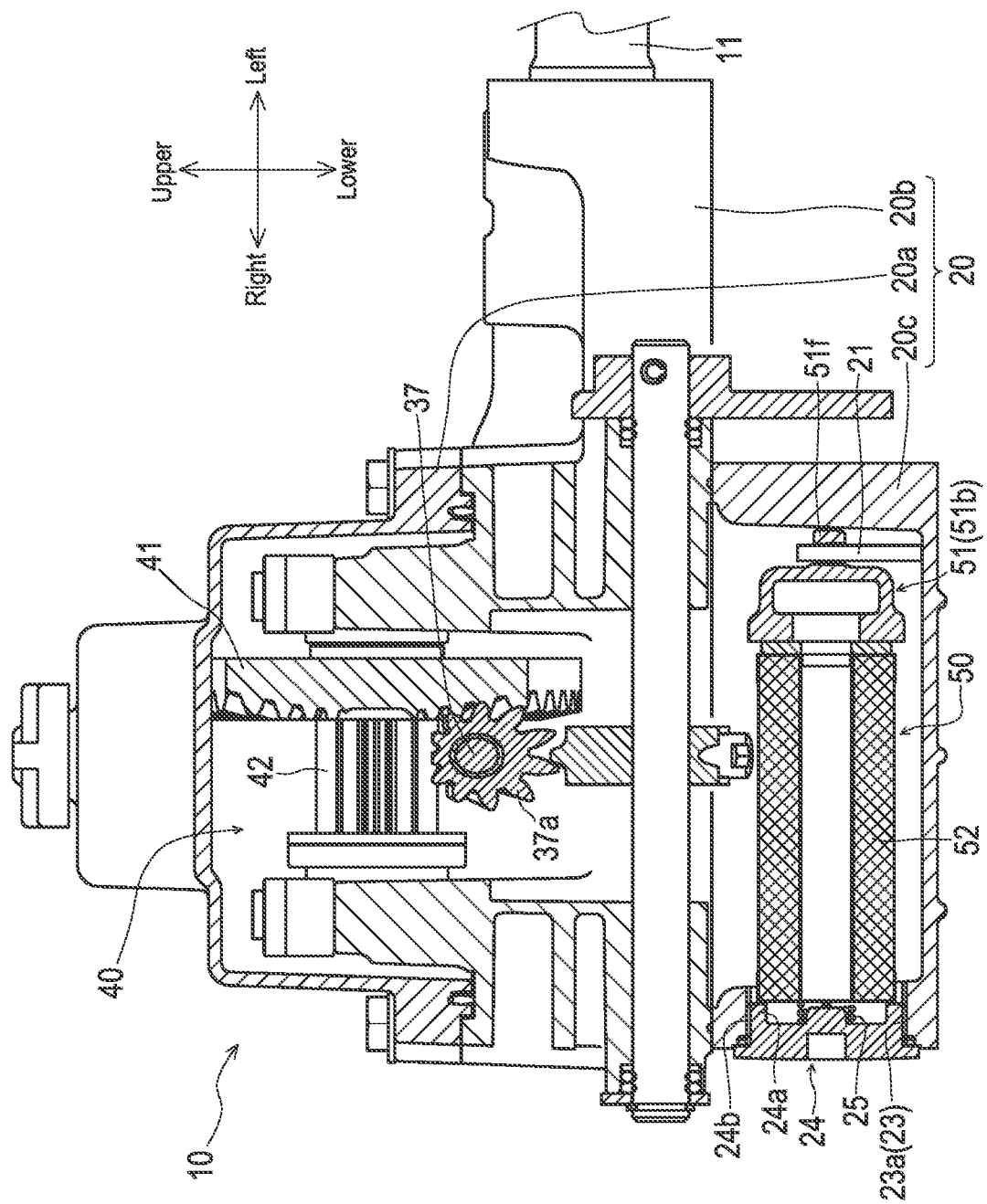
FIG. 5 is a cross-sectional view taken along B-B in FIG. 3, of the hydrostatic transaxle according to the first embodiment of the present invention.

As shown in FIGS. 3 to 5, the HST 30 is configured by the hydraulic pump 31, the hydraulic motor 32, and the center section 33.

The hydraulic pump 31 includes a vertically directed pump shaft 34 to which rotational power from the engine E (see FIG. 2) is input, and a first cylinder block 35 fixed on the pump shaft 34. In the peripheral direction of the first cylinder block 35, a plurality of first cylinders 35a, 35a, . . . are formed, and a plurality of first plungers 35b, 35b, . . . inserted through the first cylinders 35a, 35a, . . . , respectively, are included so as to freely move back and forth.

In the hydraulic motor 32, the motor shaft 37 that outputs rotation power is arranged on the center section 33 so as to be perpendicular to the longitudinal direction of the axle 11 in a plan view and to form a V-shape with respect to the pump shaft 34 in a side view. A second cylinder block 38 is provided on the motor shaft 37 so as not to rotate relative to each other. In the peripheral direction of the second cylinder block 38, a plurality of second cylinders 38a, 38a, . . . are formed, and a plurality of second plungers 38b, 38b, . . . inserted through the second cylinders 38a, 38a, . . . , respectively, are included so as to freely move back and forth.

The center section 33 fluidly connects the hydraulic pump 31 and the hydraulic motor 32 by oil passages X1, X2 (see FIG. 2) that are closed circuits drilled in the center section 33. The closed circuit includes an oil suction port 33a for supplying the hydraulic oil.

The center section 33 is provided with a first shaft hole 33b for rotatably supporting the pump shaft 34 of the hydraulic pump 31, and provided with a first installation surface 33c for installation of the first cylinder block 35. The hydraulic pump 31 is configured so as to move back and forth when the plurality of first plungers 35b, 35b, . . . slide along the movable swash plate 36, together with rotation of the first cylinder block 35 on a first installation surface 33c together with the pump shaft 34.

The center section 33 is provided with a second shaft hole 33d for rotatably supporting the motor shaft 37 of the hydraulic motor 32, and provided with a second installation surface 33e for installation of the second cylinder block 38. The hydraulic motor 32 is configured so that the second cylinder block 38 is rotated with the motor shaft 37 on the second installation surface 33e in accordance with the plurality of second plungers 38b, 38b, . . . reciprocating to slide along the fixed swash plate 39 by the hydraulic oil fed from the hydraulic pump 31, and rotation output is performed from the motor shaft 37.

The reduction gear train 40 is a portion that decelerates the rotation output from the motor shaft 37 of the hydraulic motor 32, and is configured by a bevel gear 41, a pinion gear 42, a spur gear 43, and the like.

The bevel gear 41 is arranged on a rotation shaft 44 that is rotatably pivotally supported via a bearing with respect to the upper casing portion 20a.

The pinion gear 42 is a gear member having a smaller diameter than the bevel gear 41, and is arranged on the rotation shaft 44 in a state of being incapable of relative rotation with the bevel gear 41.

The spur gear 43 is fixed on the axle 11 that is rotatably pivotally supported via the bearing with respect to the upper casing portion 20a.

The bevel gear 41 is meshed with a bevel pinion 37a fixed on the motor shaft 37, and the pinion gear 42 is meshed with the spur gear 43. With such a configuration, the reduction gear train 40 is configured so that the rotation of the bevel pinion 37a is decelerated and transmitted to the spur gear 43 via the bevel gear 41 and the pinion gear 42. As compared with the rotation speed of the motor shaft 37, the rotation speed is decelerated, and the rotation output is performed from the axle 11.

The oil filter 50 is a portion for filtering the hydraulic oil filled in the casing 20, and is configured by a filter holding member 51 and a filter body 52.

The filter holding member 51 is a member for holding the filter body 52, includes a support base 51a, a filter connection port 51b, and the like, and is integrally molded with a synthetic resin material that is lightweight and easy to manufacture.

The support base 51a is a portion for supporting the filter holding member 51 (oil filter 50) in the casing 20 without bolts, and has a hollow cylindrical shape. The support base 51a is clamped between the center section 33 and the lower casing portion 20c in the casing 20 such that an axial direction in the cylindrical shape of the peripheral edge portion of the support base 51a is oriented in the vertical direction.

The filter connection port 51b communicates the inside of the support base 51a with the inside of the filter body 52, is a portion for holding the filter body 52, and has a pipe shape. The filter connection port 51b is extensively installed from a peripheral side surface of the support base 51a. The filter connection port 51b extends closer to an outer peripheral wall portion side of the lower casing portion 20c, and extends in the axle 11 along the outer peripheral wall portion side. A holding portion 51c for holding the filter body 52 in a parallel direction to the axle 11 is formed in an end portion of the filter connection port 51b. The holding portion 51c is slightly larger than an outer diameter of the filter body 52 and includes, in a periphery thereof, a cylindrical portion 51d covering the filter body 52 to guide the incorporation of the filter body 52. An end portion, of the holding portion 51c, opposite to the support base 51a side is arranged so as to face the filter insertion port 23 of the lower casing portion 20c. A slit 51e is partially formed in the peripheral direction of the cylindrical portion 51d to reduce suction resistance. The slit 51e is more preferable when the slit 51e opens in a region where there is less oil in a flow state, for preventing air mixing to the closed circuit. In the present embodiment, the slit 51e is oriented toward a region of the second cylinder block 38 in which oil flow is relatively gentle. A magnet holder 51f is integrally formed in the vicinity of the holding portion 51c in the filter connection port 51b, an opening slightly larger than a diameter of the magnet 21 is provided in a penetrating manner in the vertical direction, and the magnet 21 is held in an upright state in an inner bottom surface of the lower casing portion 20c. This magnet 21 absorbs an iron powder in the oil around the filter.

The filter body 52 is a substantially cylindrical filter member for filtering the hydraulic oil. The filter body 52 is fitted into the cylindrical portion 51d formed in an end portion opposite to the support base 51a side of the filter connection port 51b, is tightly fitted to the holding portion 51c, and is held and fixed by the filter connection port 51b. In the oil filter 50, the filter holding member 51 is configured by the support base 51a and the filter connection port 51b, thereby securing the degree of freedom of arrangement of the filter body 52.

In the oil filter 50, the filter body 52 is inserted to the casing 20 through the filter insertion port 23, and the entire filter body 52 can be accommodated in the casing 20.

In the hydrostatic transaxle 10L, when the filter insertion port 23 is closed with the filter cap 24, the energizing spring 25 is arranged between the filter body 52 and the filter cap 24. In the hydrostatic transaxle 10L, with such a configuration, the outlet port of the filtered oil of the filter body 52 is constantly energized in a direction in which the outlet port tightly fits with the holding portion 51c to communicate with the filter connection port 51b.

Next, the oil filter 50 will be described in more detail.

As shown in FIGS. 3 to 5, in the hydrostatic transaxle 10L, the oil filter 50 is arranged in a space between a lower surface of the center section 33 and the lower casing portion 20c, i.e., a dead space generated particularly due to diagonal arrangement of the hydraulic motor 32. While the minimum ground clearance of the hydrostatic transaxle 10 is set as large as possible even when the oil filter 50 is arranged in the lower casing portion 20c, the support base 51a of the filter holding member 51 is clamped between the lower surface of the center section 33 and the bottom surface of the lower casing portion 20c, and thereby, the oil filter 50 is securely held in a predetermined position in the casing 20.

On the lower surface of the center section 33, a plurality of positioning portions 33f, 33g, 33h project downward. The positioning portions 33f, 33g, 33h are arranged at positions where the positioning portions 33f, 33g, 33h can be circumscribed to the outer peripheral surface of the substantially cylindrical support base 51a. When the support base 51a is fitted to the inside of each of the positioning portions 33f, 33g, 33h, the support base 51a is positioned at a predetermined position. The two positioning portions 33f, 33g of the positioning portions 33f, 33g, 33h are arranged at positions where the positioning portions 33f, 33g can be engaged with engaged portions 51g, 51g projecting from the outer peripheral surface of the support base 51a. The positioning portions 33f, 33g are configured so that the engaged portions 51g, 51g are engaged with the positioning portions 33f, 33g, and thereby, rotation of the support base 51a about the cylindrical axis is restricted, and orientation of the filter connection port 51b is oriented so that a terminal end portion (end portion opposite to the support base 51a side) of the filter connection port 51b faces the filter insertion port 23.

In the oil filter 50, ring-shaped concave portions 51h, 51h for fitting O-rings 57 are respectively formed on upper and lower peripheral end surfaces of the support base 51a. In the portion clamped between the center section 33 and the lower casing portion 20c, an oil-tight state inside and outside thereof is maintained by the O-rings 57 so that contaminated oil does not enter the support base 51a.

As shown in FIGS. 3 and 4, in the hydrostatic transaxle 10L, an oil suction port 33a is contained inside the support base 51a of the oil filter 50. In order to cause the hydraulic oil filtered by the filter body 52 to flow into the oil suction port 33a through the filter connection port 51b and the support base 51a, the hydrostatic transaxle 10L has a configuration in which the charge pump 55 is arranged inside the support base 51a of the oil filter 50 and attached to the lower surface of the center section 33 so that the hydraulic oil filtered by the filter body 52 can be pressurized by the charge pump 55 and caused to flow into the oil suction port 33a.

As shown in FIGS. 1, 4 and 5, the hydrostatic transaxle 10 has a configuration in which the filter insertion port 23 of the casing 20 is arranged on an inner wall opposite to an outer wall from which the axle 11 projects, so that the filter body 52 can be taken in and out through the filter insertion port 23 in a state where the filter cap 24 is removed.

With such a configuration, in the hydrostatic transaxle 10, since the filter insertion ports 23 face each other, exchange of the filter body 52 can be performed easily.

The hydrostatic transaxle 10L has a configuration in which the energizing spring 25 is interposed between the filter cap 24 and the filter body 52 so that the filter body 52 is constantly energized toward the filter connection port 51b side by the energizing spring 25 in a state where the filter cap 24 is attached to the filter insertion port 23.

With such a configuration, in the hydrostatic transaxle 10L, the oil tightness between the holding portion 51c of the filter connection port 51b and the filter body 52 is ensured so that the contaminated oil is prevented from passing through the filter body 52 and flowing into the filter connection port 51b.

The charge pump 55 is a pump for supplying the hydraulic oil to the oil suction port 33a, and includes a charge pump housing 55a, an inner rotor 55b, and an outer rotor 55c.

In the charge pump 55, the charge pump housing 55a is disposed in the upper and lower cylindrical support base 51a of the filter holding member 51 in the oil filter 50, and is engaged to the center section 33 above the charge pump housing 55a via the positioning portions 33f, 33g, 33h, so as to be vertically slidable. A trochoid-type inner rotor 55b and an outer rotor 55c are installed inside the charge pump housing 55a. A downward extending portion of the pump shaft 34 from the center section 33 serves as a drive shaft of the inner rotor 55b, and is rotatably pivotally supported in the charge pump housing 55a.

An energizing spring 56 is interposed between a bottom inner surface of the lower casing portion 20c and the lower surface of the charge pump housing 55a. With this energizing force, a pressing force to the lower surface of the center section 33 of the charge pump 55 (the inner rotor 55b, the outer rotor 55c) is determined. In accordance with this pressing force, the amount of oil leakage of replenishing oil discharged from the charge pump 55 toward the oil suction port 33a changes, so that a function such as a relief valve for simply setting the charge pressure can be provided.

In the hydrostatic transaxle 10L, even with such a configuration including the floating type charge pump 55, exchange of the filter body 52 can be performed easily.

Figure 6:
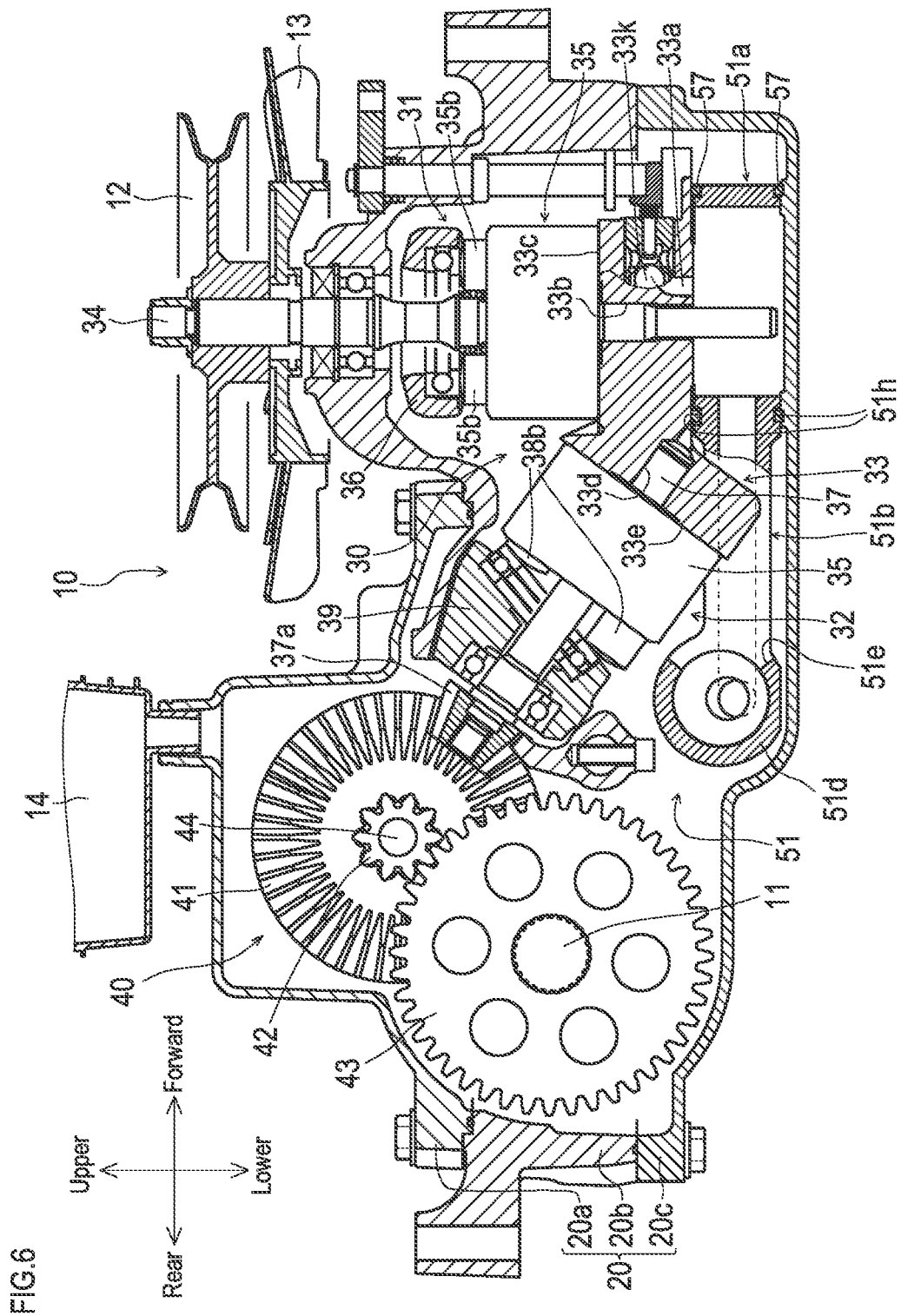
FIG. 6 is a cross-sectional schematic view of the hydrostatic transaxle (in a case without a charge pump) according to the first embodiment of the present invention in a right side view.

As shown in FIG. 6, the hydrostatic transaxle 10L may have a configuration not including a charge pump, and may be configured so that clean oil is supplied from the oil suction port 33a located in the support base 51a by self-suction action of the hydraulic pump 31.

Next, a hydrostatic transaxle 60 that is a hydrostatic transaxle according to a second embodiment of the present invention will be described with reference to FIGS. 6 to 10.

In the lawn mower 1, instead of the above-described hydrostatic transaxle 10, the hydrostatic transaxle 60 according to the second embodiment described below can also be adopted.

A pair of right and left hydrostatic transaxles 60L, 60R provided in the lawn mower 1 (see FIG. 1) has a shape that is line-symmetrical with each other, and although the shapes of the hydrostatic transaxles 60L, 60R are different from each other, the configuration and the like of the inside of the device are common. Thus, in the below description of the detailed configuration, the hydrostatic transaxle 60L provided in the left side of the lawn mower 1 will be described as an example, and the description of the hydrostatic transaxle 60R, which is equivalent to the hydrostatic transaxle 60L, provided in the right side of the lawn mower 1 will be omitted. Since the components used for the hydrostatic transaxle 60L are substantially functionally the same as those used for the above-described hydrostatic transaxle 10L, detailed description thereof will be omitted, and the description will focus mainly on the changed portion.

As shown in FIGS. 7 to 10, a hydrostatic transaxle 60L that is the hydrostatic transaxle according to a second embodiment of the present invention includes a casing 70, an HST 80, a reduction gear train 90, an oil filter 100, and the like.

The casing 70 is a casing that is filled with the hydraulic oil and covers the HST 80, the reduction gear train 90, the oil filter 100, and the like, and is configured by an upper casing portion 71 and a lower casing portion 72. Reference numeral 64 denotes a reserve tank.

Figure 7:
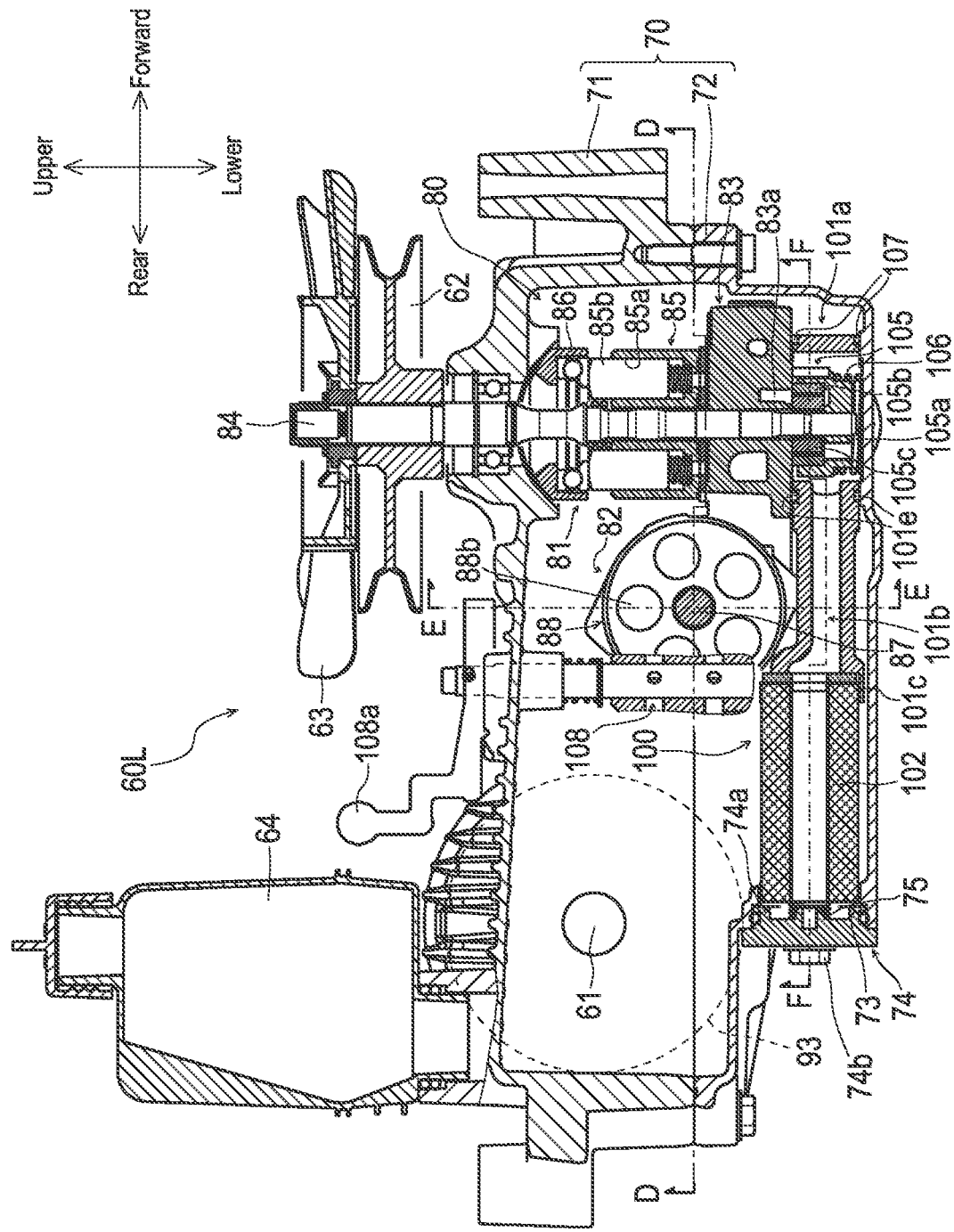
FIG. 7 is a schematic cross-sectional view of the hydrostatic transaxle according to a second embodiment of the present invention in a right side view.
Figure 8:
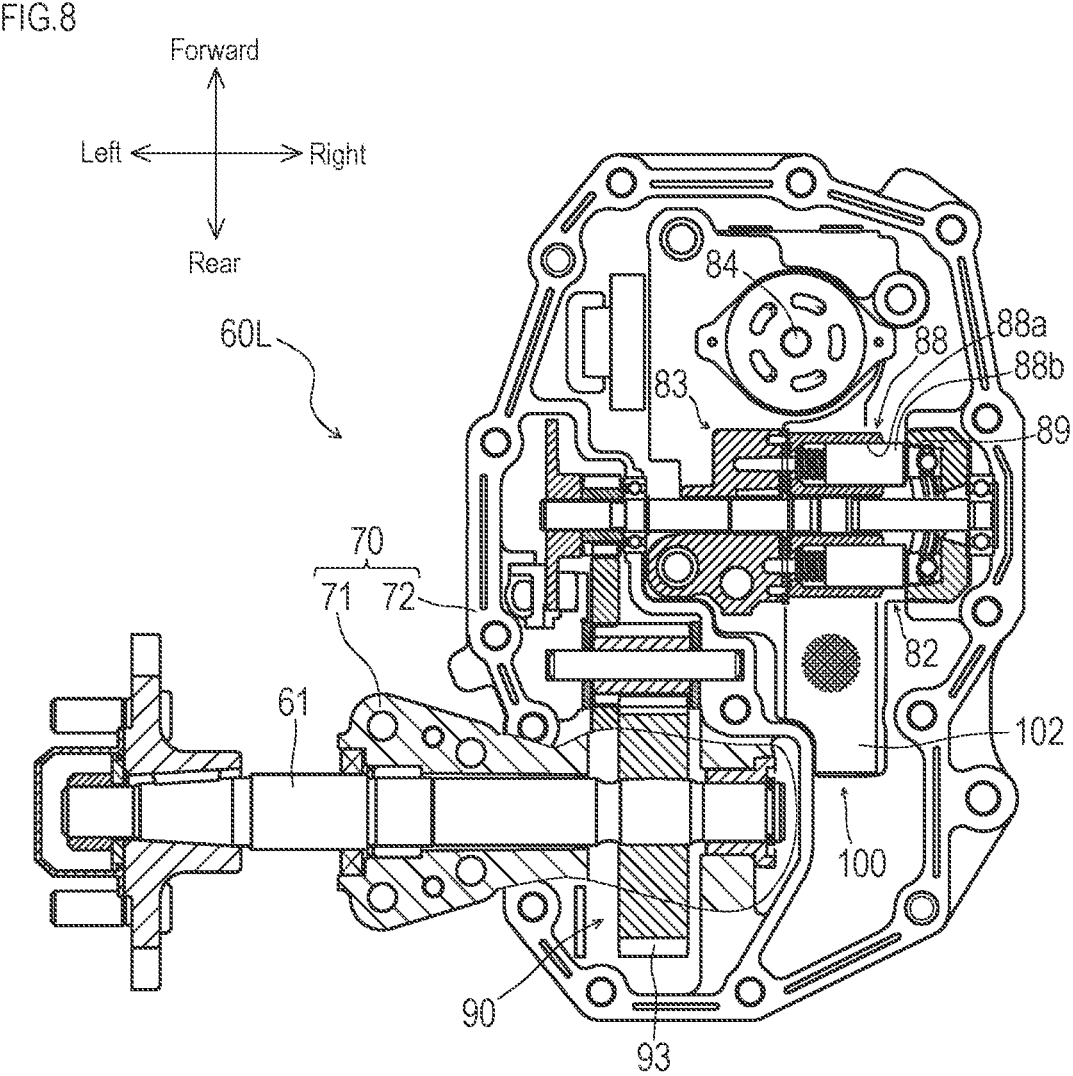
FIG. 8 is a cross-sectional view taken along D-D in FIG. 7, of a hydrostatic transaxle according to the second embodiment of the present invention.
Figure 10:
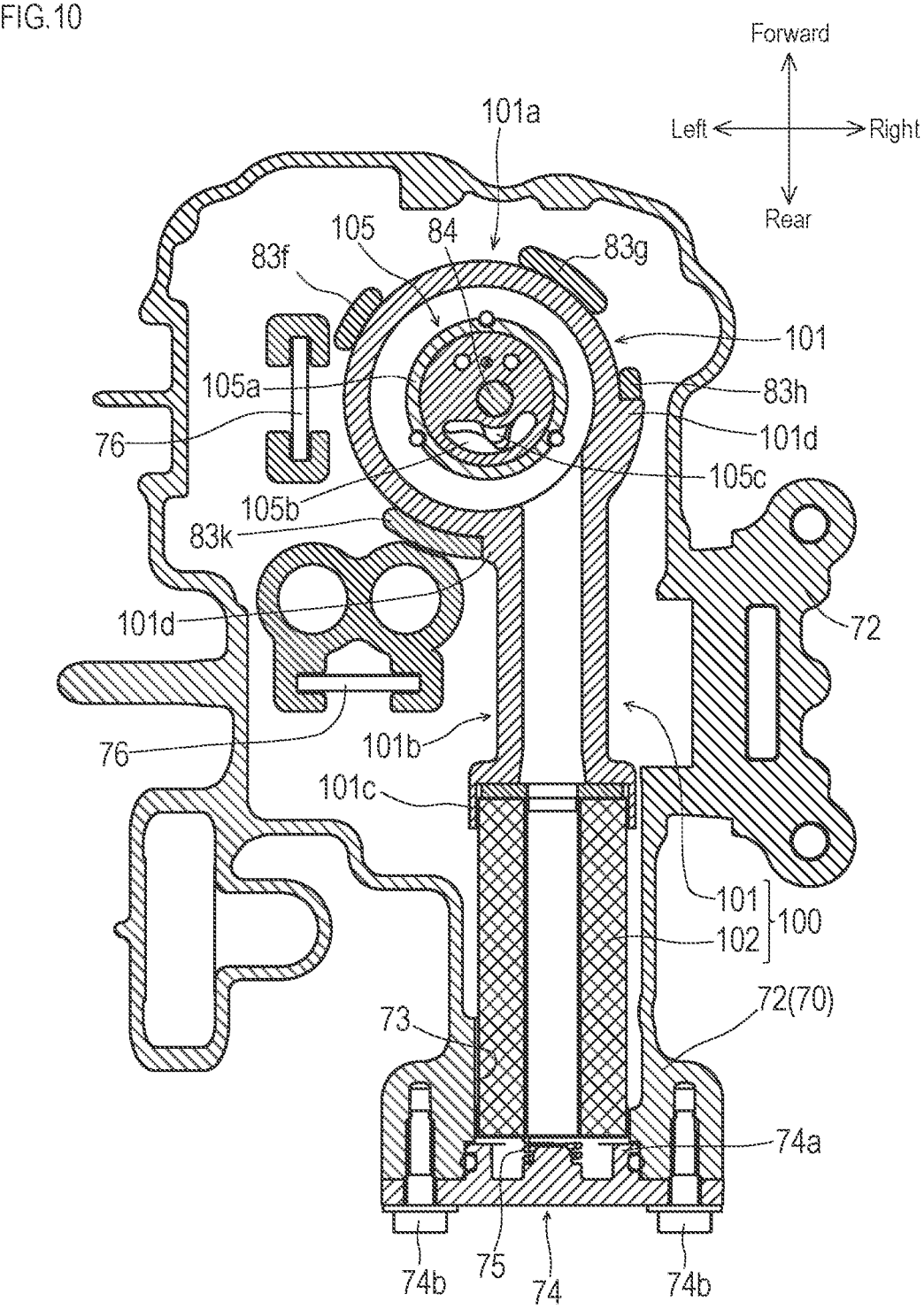
FIG. 10 is a cross-sectional view taken along F-F in FIG. 7, of the hydrostatic transaxle according to the second embodiment of the present invention.

As shown in FIGS. 7 and 10, the lower casing portion 72 is provided with a filter insertion port 73 for insertion and removal of a filter (a filter body 102 described later) in a rear side wall. The filter insertion port 73 is openable and closable by a filter cap 74 constituting a part of the casing 70.

In the center section 83 of the HST, a first installation surface 83c for installation of the first cylinder block 85 of the hydraulic pump 81, and a second installation surface 83e for arrangement of the second cylinder block 88 of the hydraulic motor 82 are formed at a right angle to each other.

The reduction gear train 90 is a portion that decelerates the rotation output from the motor shaft 87 of the hydraulic motor 82, and is configured by a plurality of spur gears 91, 92, 93.

The oil filter 100 is a portion for filtering the oil filled in the casing 70, and is configured by a filter holding member 101 and a filter body 102.

The filter holding member 101 is a member for holding the filter body 102, and includes a support base 101a, a filter connection port 101b, and the like.

Figure 9:
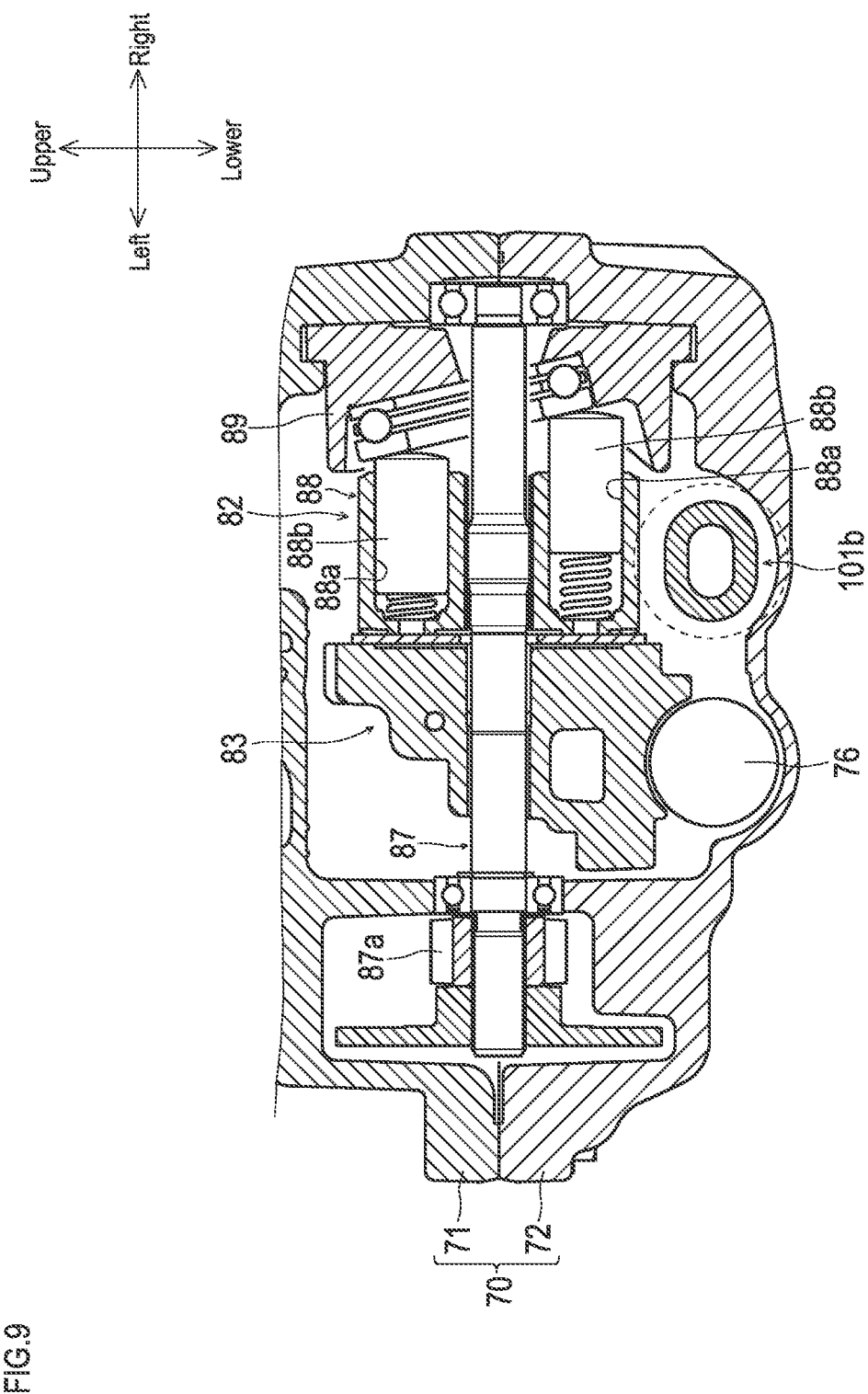
FIG. 9 is a cross-sectional view taken along E-E in FIG. 7, of the hydrostatic transaxle according to the second embodiment of the present invention.

In the oil filter 100, the filter connection port 101b is extensively installed from a peripheral side surface of the support base 101a toward a rear wall of the casing 70. The filter connection port 101b passes under the hydraulic motor 32 so that the inside of the cylinder of the support base 101a and the filter connection port 101b communicate with each other. A holding portion 101c for holding the filter body 102 in a direction perpendicular to the axle 61 is formed in an end portion, of the filter connection port 101b, opposite to the support base 101a. The holding portion 101c is slightly larger than an outer diameter of the filter body 102, and is a portion configured to be fitted to the filter body 102. An end portion opposite to the support base 101a side of the holding portion 101c is arranged so as to face the filter insertion port 73 of the lower casing portion 72. As shown in FIG. 9, the portion passing under the hydraulic motor 32 in the filter connection port 101b has a shape that is vertically flattened, thereby minimizing the protrusion of a bottom surface of the lower casing portion 72 toward the ground, and securing the minimum ground clearance of the hydrostatic transaxle.

In the hydrostatic transaxle 60L, when the filter insertion port 73 is closed with the filter cap 74, the filter body 102 is pressurized to the holding portion 101c by the energizing spring 75 located between the filter body 102 and the filter cap 74.

In the charge pump 105 for supplying oil to the oil suction port 83a, the charge pump housing 105a is disposed in the upper and lower cylindrical support base 101a of the oil filter 100, and a floating type charge pump is configured by an energizing spring 106 arranged between the inner bottom surface of the lower casing portion 72 and the charge pump housing 105a.

The charge pump 105 sucks and adjusts the clean oil in the oil reservoir in the support base 101a of the oil filter 100 to a charge pressure equivalent to the energizing spring 106 to discharge the oil to supply the oil to the closed circuit of the HST 30 via the oil suction port 83a of the center section 83 and the charge check valve (not shown).

Next, the oil filter 100 will be described in more detail.

As shown in FIGS. 7 to 10, the oil filter 100 provided in the hydrostatic transaxle 60L is arranged and clamped between the lower surface of the center section 83 and the lower casing portion 72 to be held in a predetermined position in the casing 70.

A plurality of positioning portions 83f, 83g, 83h, 83k are provided on the lower surface of the center section 83 so as to project downward and regulate the rotation about the cylindrical axis of the support base 101a, and orientation of the filter connection port 101b is a predetermined orientation in which a terminal end portion (end portion in the side opposite to the support base 101a side) of the filter connection port 101b faces the filter insertion port 73. A magnet 76 for absorbing an iron powder in the oil is appropriately arranged around the filter holding member 101.

In the filter holding member 101 of the oil filter 100, O-rings 107 for maintaining the oil-tight state are fitted in the upper and lower end surfaces of the support base 101a, respectively, and a gap between the lower surface of the center section 83 and the inner bottom surface of the lower casing portion 72 is eliminated.

The hydrostatic transaxle 60L has a configuration in which the filter insertion port 73 of the casing 70 is arranged in a position facing the rear end portion of the filter body 102 of the oil filter 100, so that the filter body 102 can be taken in and out through the filter insertion port 73 in a state where the filter cap 74 is removed.

With such a configuration, in the hydrostatic transaxle 60L, exchange of the filter body 102 can be easily performed.

In the hydrostatic transaxle 60L, the energizing spring 75 is interposed between the filter cap 74 and the filter body 102, and the oil tightness between the holding portion 101c of the filter connection port 101b and the filter body 102 is ensured.

Figure 11:
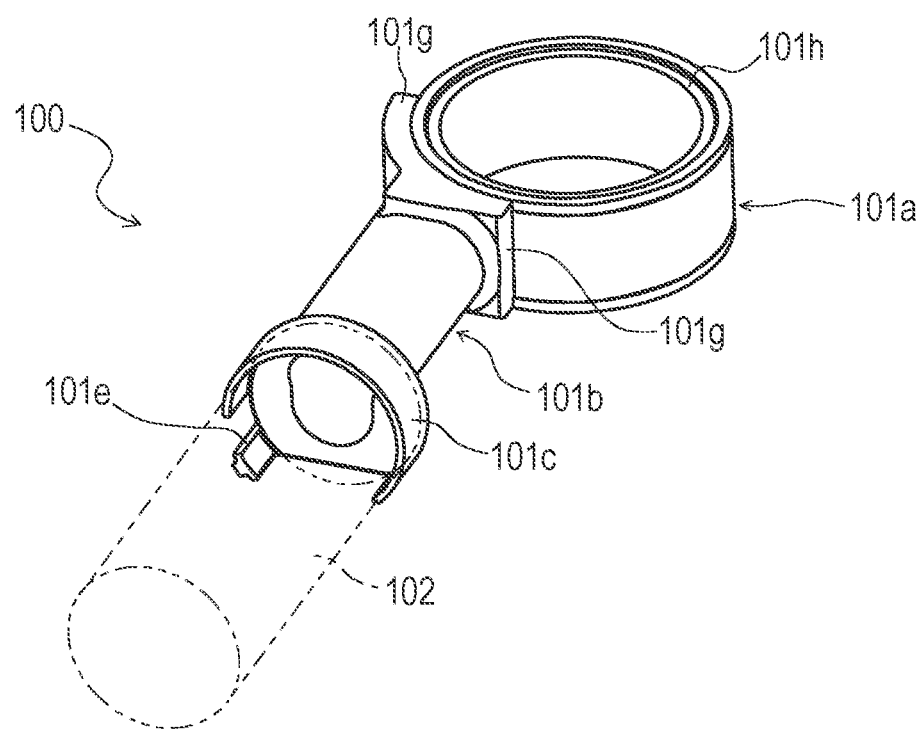
FIGS. 11A and 11B are perspective views showing an oil filter constituting a hydrostatic transaxle according to an embodiment of the present invention, where
Figure 11:
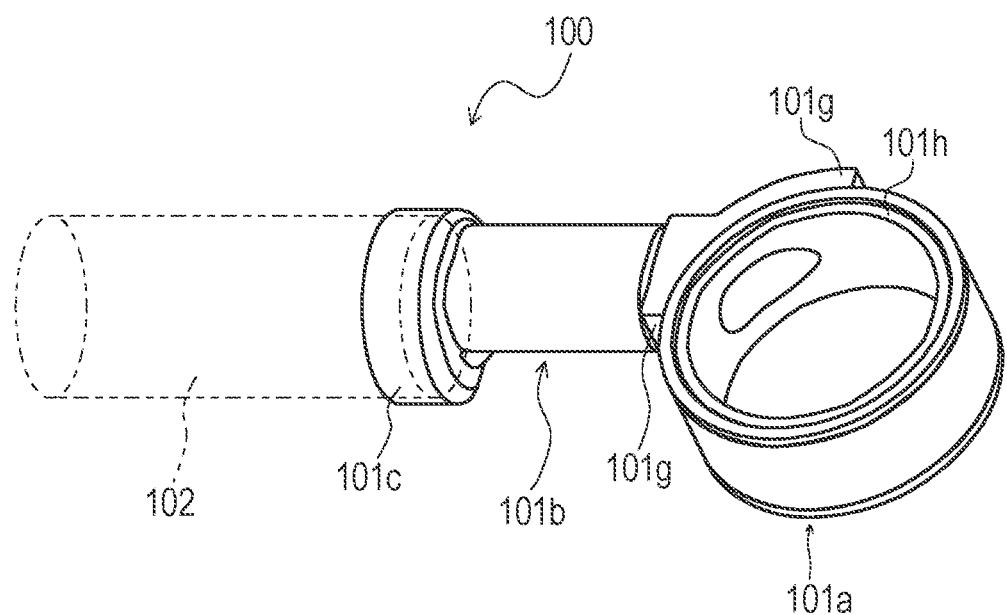
Figure 12:
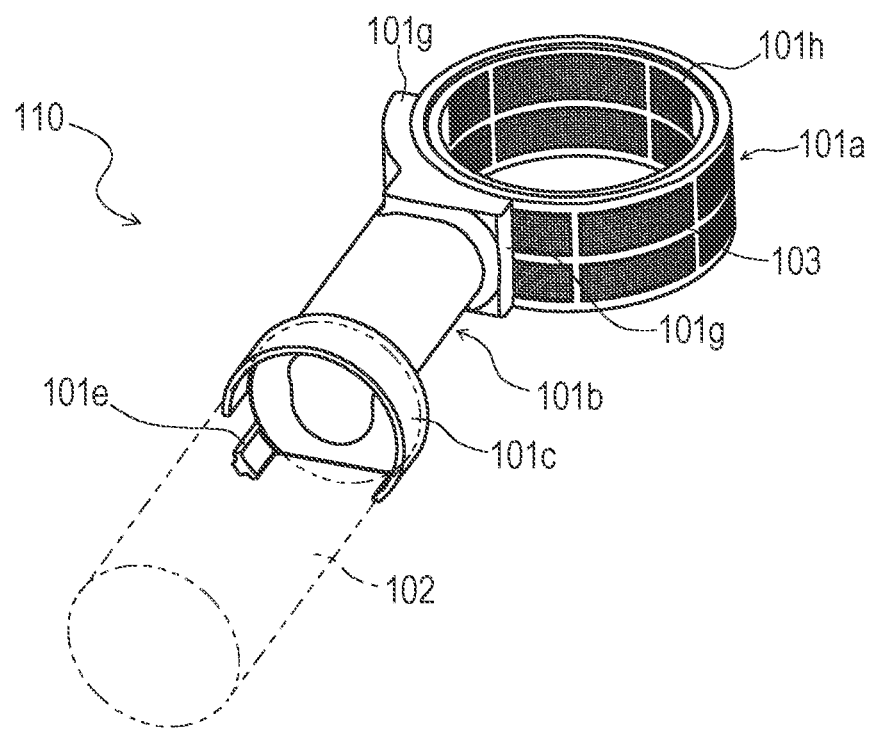
FIGS. 12A and 12B are schematic views showing an oil filter (in a case where a support base has a filter portion) constituting the hydrostatic transaxle according to an embodiment of the present invention, where
Figure 12:
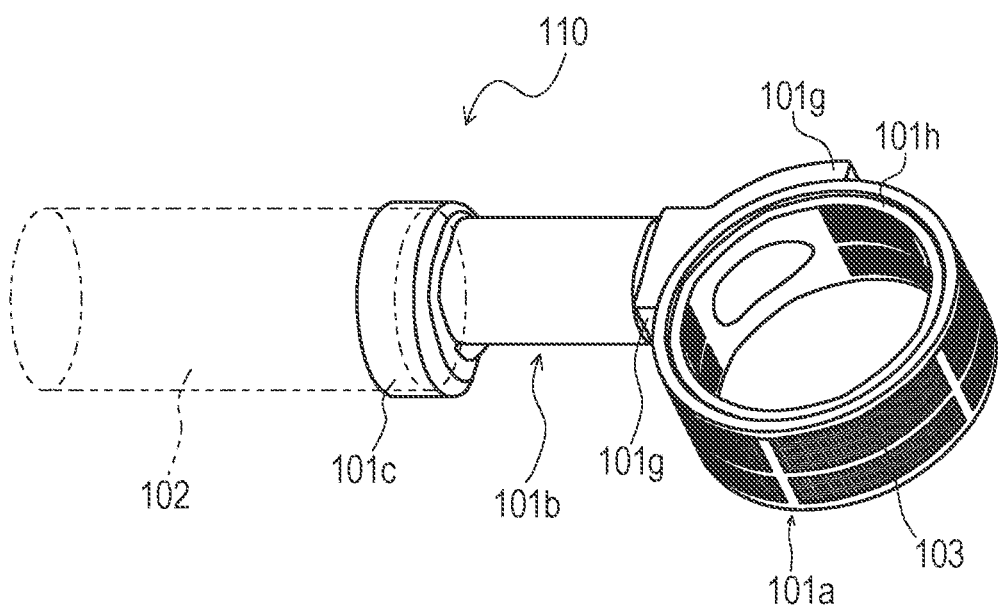

Although the hydrostatic transaxle 60L does not have a filtering function in the support base 101a as shown in FIGS. 11A and 11B, a filtering function may be imparted to the support base 101a as shown in FIGS. 12A and 12B.

The oil filter 110 shown in FIGS. 12A and 12B includes a filter portion 103 in the support base 101a. Therefore, the oil filter 110 has a filtering function of the oil in the filter portion 103 of the support base 101a and the filter body 102, and a filtration area is increased as compared with the oil filter 100.

In the hydrostatic transaxle 60L including the oil filter 110 having such a configuration, clogging of the filter body 102 can be suppressed and the maintenance frequency can be reduced by the filter portion 103 capable of filtering the oil.

In the hydrostatic transaxle 10L shown in FIGS. 3 to 6, the support base 51a of the oil filter 50 does not have a filtering function, but a portion corresponding to the filter portion 103 in the oil filter 110 may be provided in the support base 51a.

Here, a hydrostatic transaxle 120 according to a third embodiment will be described with reference to FIGS. 13 to 15. In the lawn mower 1, instead of the above-described hydrostatic transaxles 10 and 60, the hydrostatic transaxle 120 according to the third embodiment described below can also be adopted. In the hydrostatic transaxle 120 shown in FIGS. 13 to 15, the same reference numerals are given to portions having the same configuration as the hydrostatic transaxle 10 according to the first embodiment. In the following description, the descriptions of the portions given the same reference numerals will be omitted.

The pair of right and left hydrostatic transaxles 120 are provided in the lawn mower 1 (see FIG. 1). Each of the pair of right and left hydrostatic transaxles 120 has a shape that is line-symmetrical with each other, and although the shapes of the hydrostatic transaxles 120 are different from each other, the configuration and the like of the inside of the device are common. Thus, in the below description of the detailed configuration, the hydrostatic transaxle 120 provided in the left side of the lawn mower 1 will be described as an example. Since the components used for the hydrostatic transaxle 120 are substantially functionally the same as those used for the above-described hydrostatic transaxles 10 and 60, detailed description thereof will be omitted, and the description will focus mainly on the changed portion.

Figure 13:
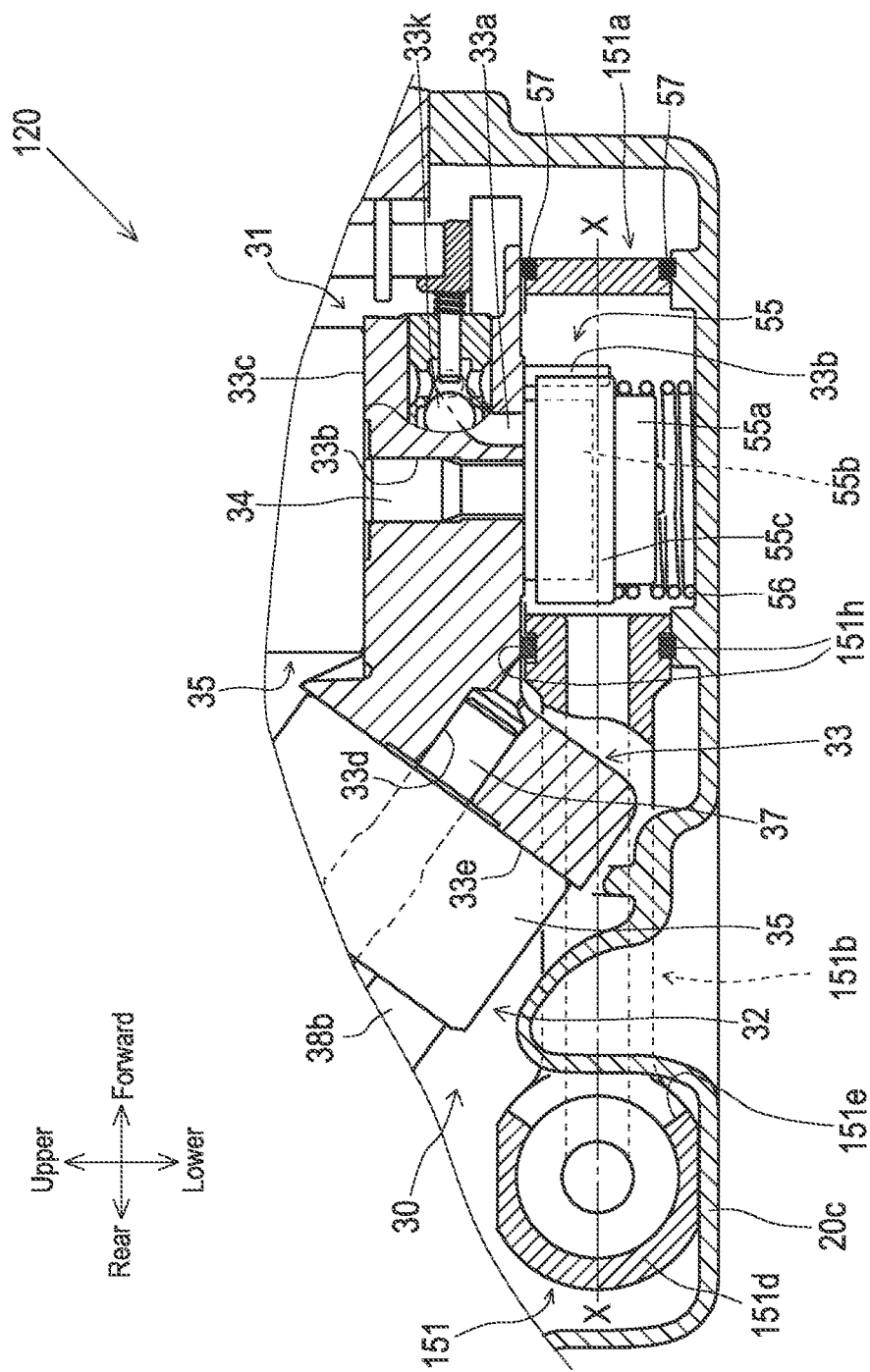
FIG. 13 is a hydraulic system diagram of a work vehicle (lawn mower) including a hydrostatic transaxle according to a third embodiment of the present invention.
Figure 14:
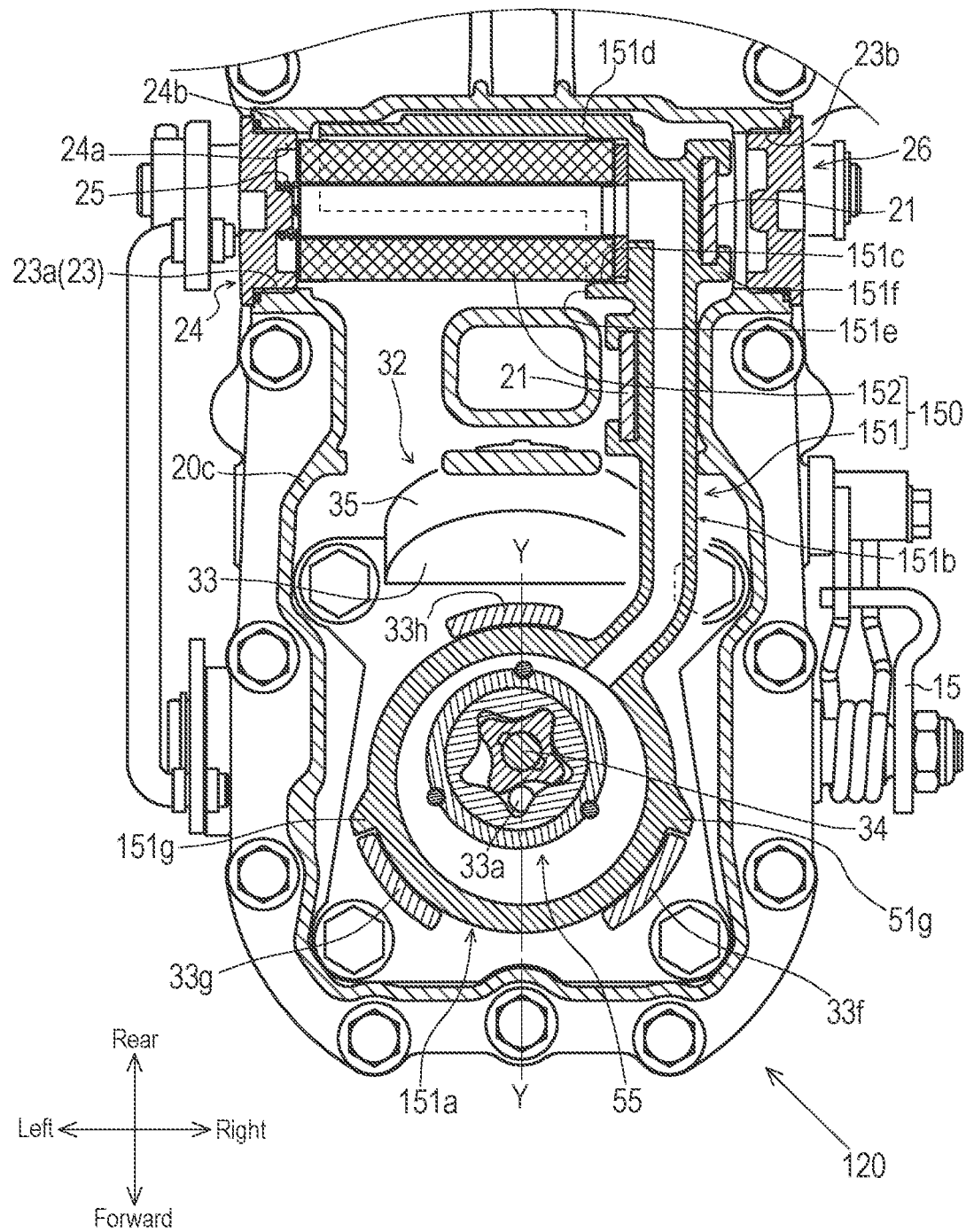
FIG. 14 is a hydraulic system diagram of the work vehicle (lawn mower) including the hydrostatic transaxle according to the third embodiment of the present invention.
Figure 15:
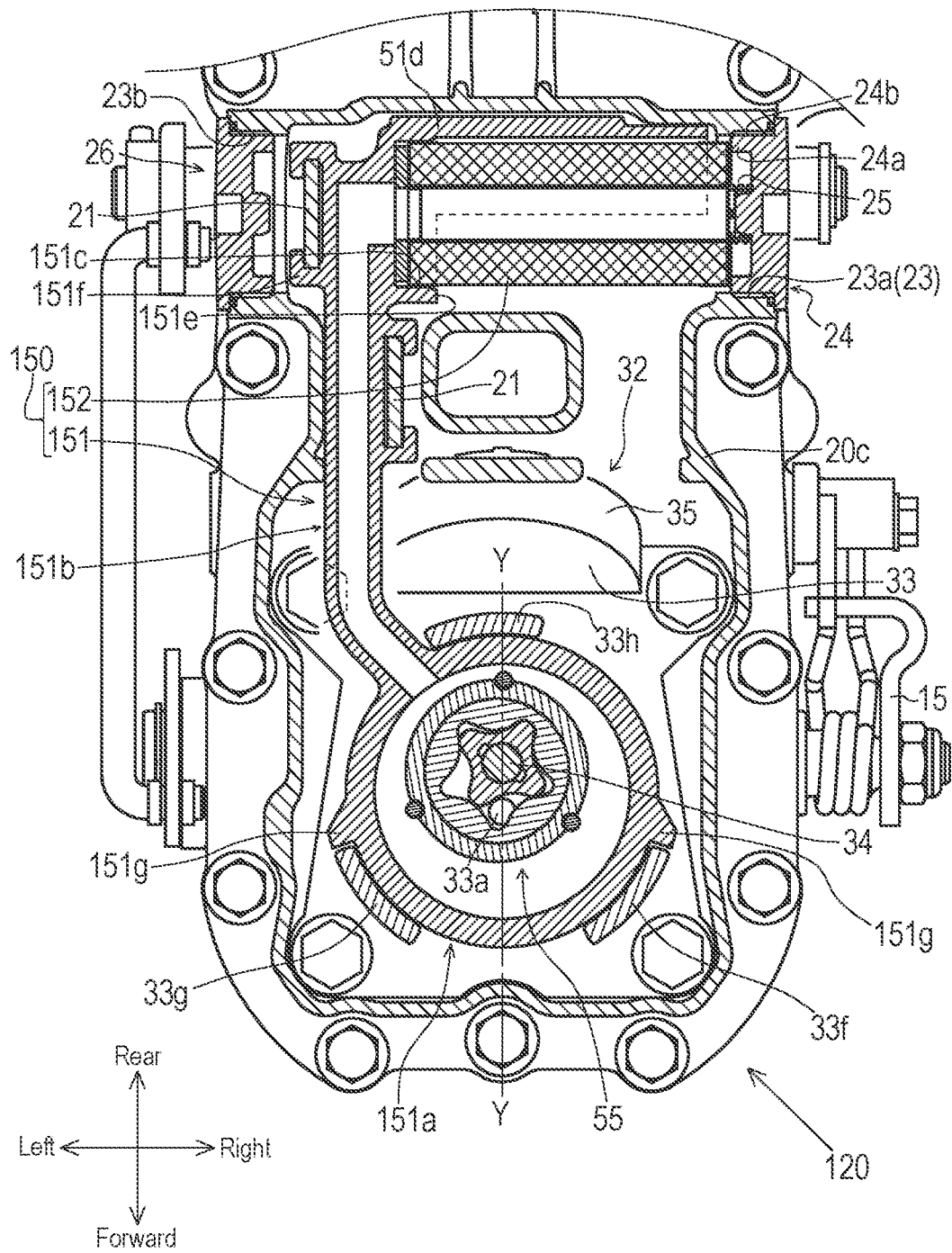
FIG. 15 is a hydraulic system diagram of the work vehicle (lawn mower) including the hydrostatic transaxle according to the third embodiment of the present invention.
Figure 16:
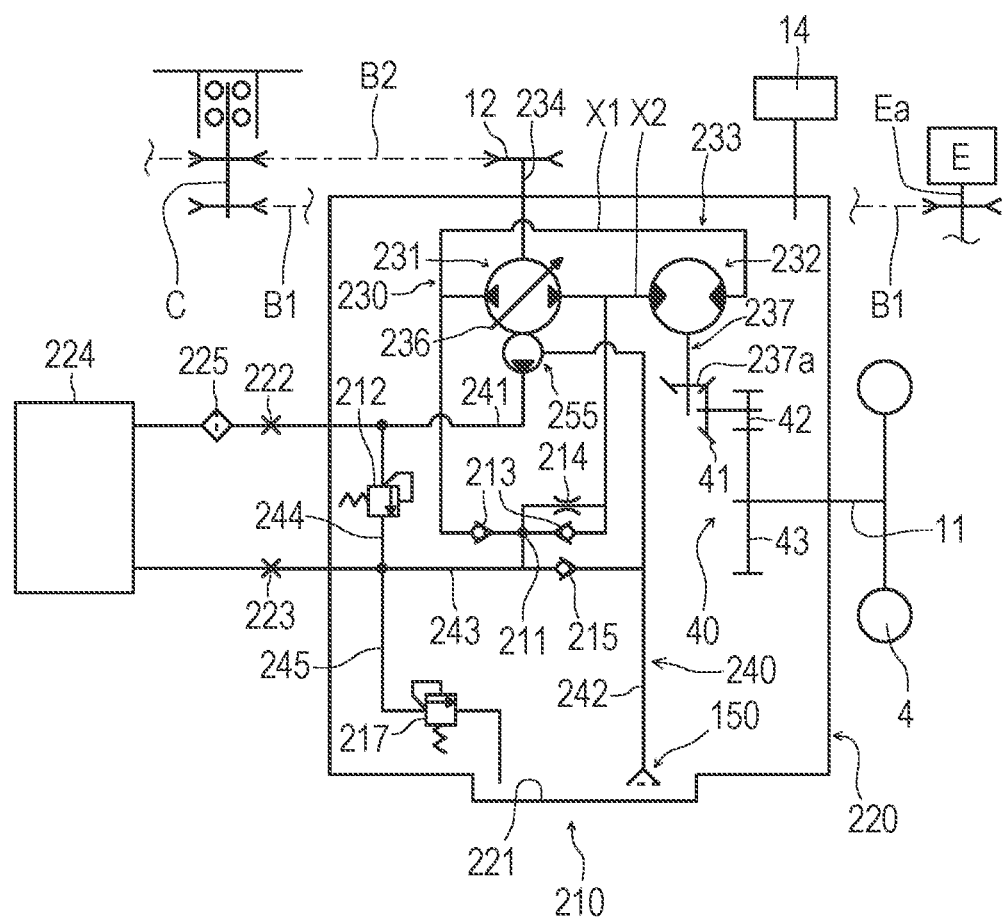
FIG. 16 is a hydraulic system diagram of a work vehicle (lawn mower) including a hydrostatic transaxle according to a fourth embodiment of the present invention.
Figure 17:
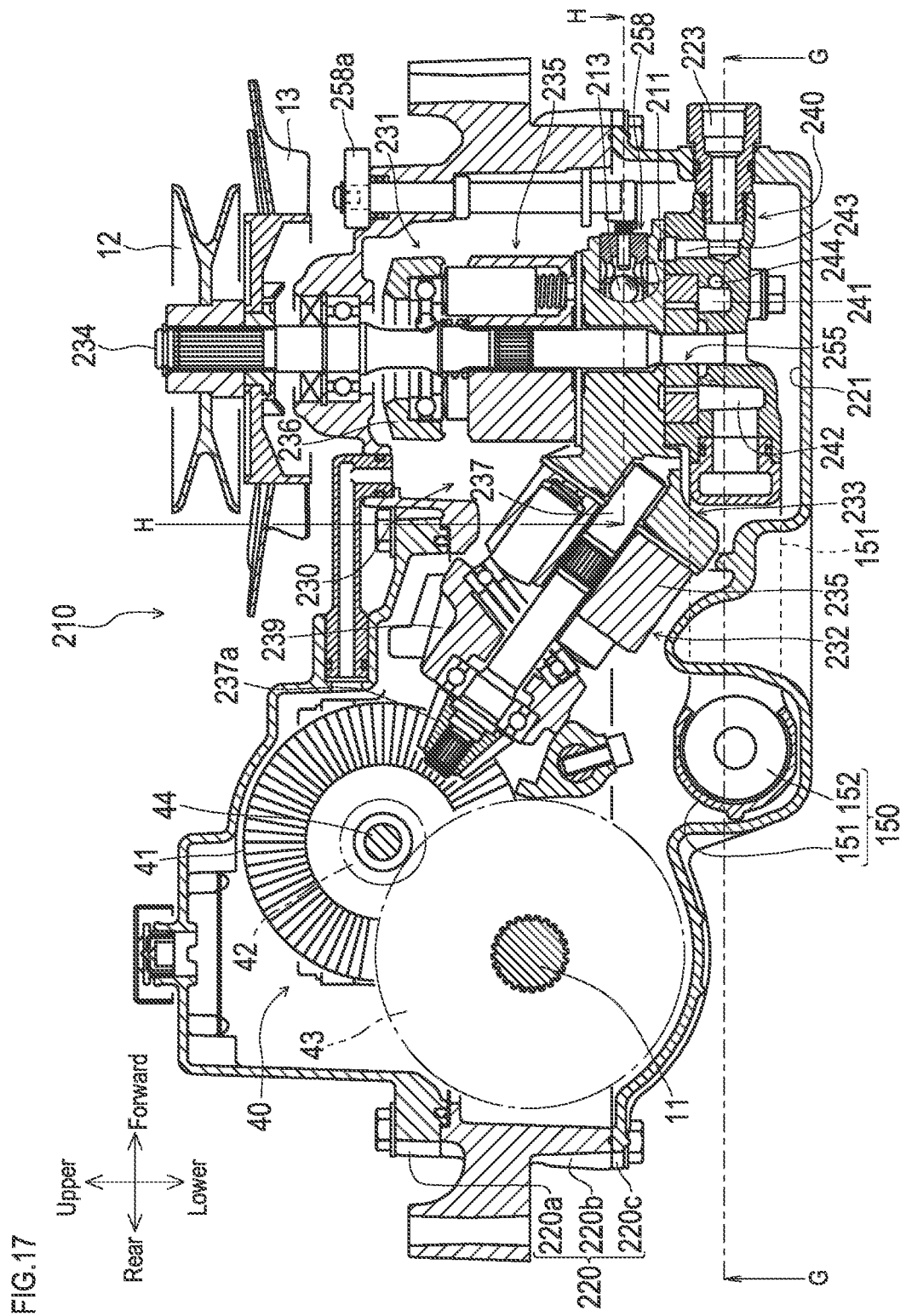
FIG. 17 is a schematic cross-sectional view (J-J in FIG. 18) of the hydrostatic transaxle according to the fourth embodiment of the present invention in a right side view.

As shown in FIGS. 13 to 15, the hydrostatic transaxle 120 includes an oil filter 150. The oil filter 150 is configured by a filter holding member 151 and a filter body 152. In the hydrostatic transaxle 120, the filter holding member 151 is arranged along the inner wall of the lower casing portion 20c.

The filter holding member 151 is configured so that the filter holding member can be used either when a filter insertion hole 23 is arranged on the left side portion of the lower casing portion 20c as shown in FIG. 14 or when the filter insertion hole 23 is arranged on the right side portion of the lower casing portion 20c as shown in FIG. 15. The filter holding member 151 has a vertically symmetrical shape with reference to the virtual horizontal plane Y-Y (see FIG. 14 and FIG. 15) so that the filter holding member can be flipped horizontally with reference to the virtual vertical plane X-X (see FIG. 13) set in the forward-rear direction.

The filter holding member 151 is a member for holding the filter body 152 and is a member having substantially the same configuration as that of the above-described filter holding member 51, and includes a support base 151a, a filter connection port 151b, a holding portion 151c, a cylindrical portion 151d, a slit 151e, a magnet holder 151f, an engaged portion 151g, and a concave portion 151h, which are corresponding to respective portions of the filter holding member 51. The filter holding member 151 is integrally molded with a synthetic resin material that is lightweight and easy to manufacture.

In the oil filter 150, the filter body 152 is inserted to the casing 20 through the filter insertion port 23, and the entire filter body 152 can be accommodated in the casing 20.

In the lower casing portion 20c, a spare screw hole 23b is formed at a position bilaterally symmetrical to the filter insertion hole 23 and a spare filter cap 26 for sealing the screw hole 23b is provided in the screw hole 23b.

In the hydrostatic transaxle 120 having such a configuration, either the female screw 23a or the screw hole 23b can be used as the filter insertion hole 23, and in accordance with the required specifications of the hydrostatic transaxle 120, the orientation of the filter insertion hole 23 can be selected from either left or right. Accordingly, in the hydrostatic transaxle 120, it is possible to select the orientation of the filter insertion hole 23 on the side where the maintenance work of the oil filter 150 can be performed easily according to the configuration of the hydrostatic transaxle 120.

Next, a hydrostatic transaxle 210 that is a hydrostatic transaxle according to a fourth embodiment of the present invention will be described with reference to FIGS. 16 to 21. In the hydrostatic transaxle 210 shown in FIGS. 16 to 21, the same reference numerals are given to portions having the same configuration as the hydrostatic transaxle 10 according to the first embodiment. In the following description, the descriptions of the portions given the same reference numerals will be omitted.

The pair of right and left hydrostatic transaxles 210 are provided in the lawn mower 1 (see FIG. 1). Each of the pair of right and left hydrostatic transaxles 210 has a shape that is line-symmetrical with each other, and although the shapes of the hydrostatic transaxles 210 are different from each other, the configuration and the like of the inside of the devices are common. Thus, in the below description of the detailed configuration, the hydrostatic transaxle 210 provided in the left side of the lawn mower 1 will be described as an example. Since the components used for the hydrostatic transaxle 210 are substantially functionally the same as those used for the above-described hydrostatic transaxles 10 and 60, detailed description thereof will be omitted, and the description will focus mainly on the changed portion.

The hydrostatic transaxle 210 shown in FIGS. 16 to 21 is an embodiment of a pair of right and left hydrostatic transaxles provided in the lawn mower 1. The hydrostatic transaxle 210 is a device for driving the rear wheel 4 (see FIG. 1) of the lawn mower 1 to rotate and includes a casing 220, an HST 230, a reduction gear train 40, an oil filter 150, and the like.

The casing 220 is a casing that covers the HST 230, the reduction gear train 40, the oil filter 150, and the like, and is configured by placing an upper casing portion 220a, a middle casing portion 220b, and a lower casing portion 220c on top of one another, and is filled with hydraulic oil in the inside.

In the side surface of the lower casing portion 220c, a filter insertion port 227 to which a filter body 152 that filters the hydraulic oil is inserted and removed is formed. The filter insertion port 227 is openable and closable by a filter cap 228 constituting a part of the lower casing portion 220c. The filter cap 228 is configured to be freely attached to and detached from the filter insertion port 227.

The hydrostatic transaxle 210 includes the oil filter 150 described above. The oil filter 150 is configured by a filter holding member 151 and a filter body 152. In the hydrostatic transaxle 210, the filter holding member 151 is arranged along the inner wall of the lower casing part 220c, and the longitudinal direction of the filter body 152 is arranged in parallel with the axle 11. In the lower casing portion 220c, a pair of filter insertion holes 270 and a spare hole 220d are formed in each of left and right side portions. In the lower casing part 220c, a spare hole 220d of the same shape is formed at a position symmetrically and vertically corresponding to the filter insertion hole 270.

Figure 18:
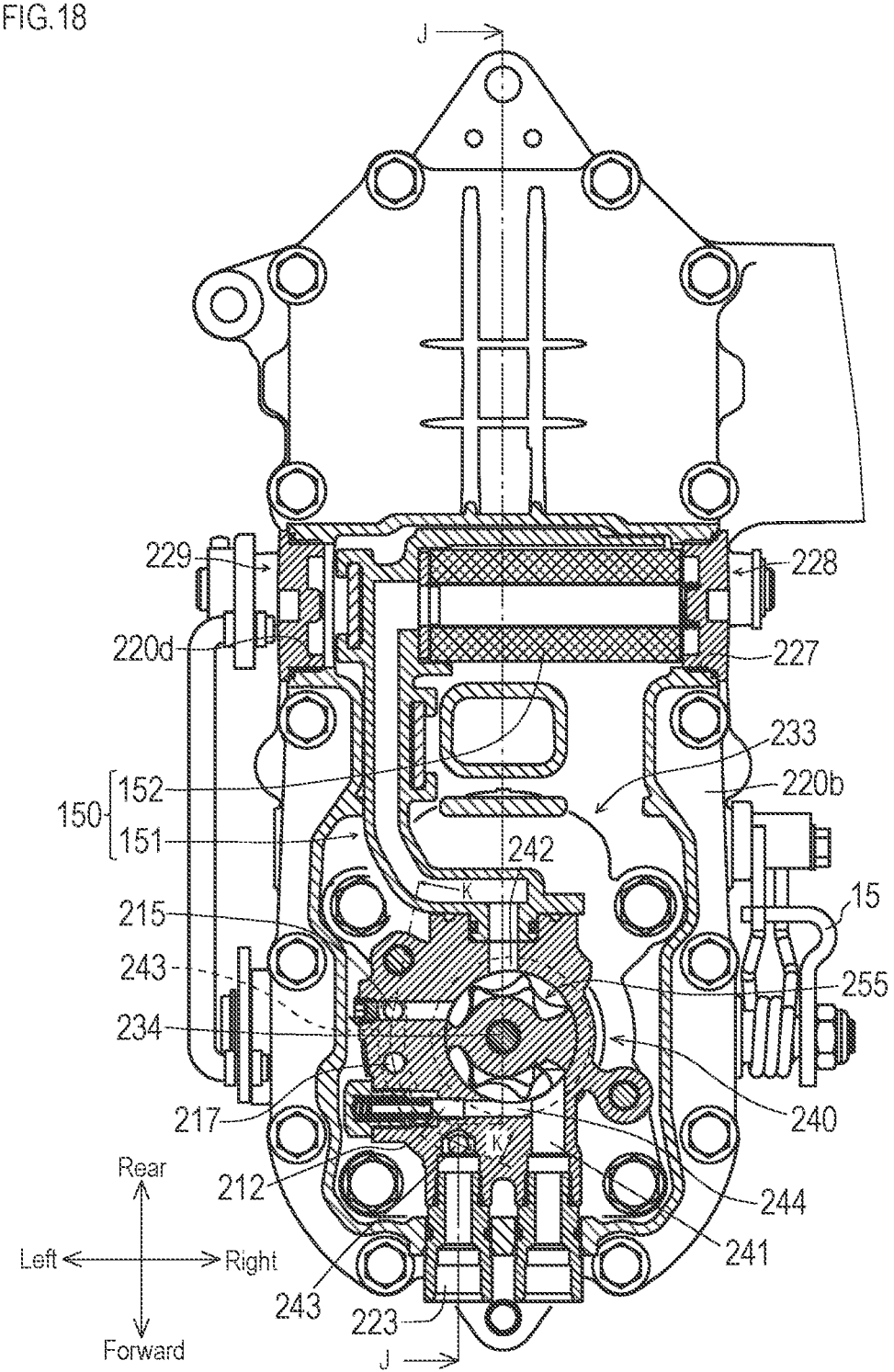
FIG. 18 is a cross-sectional view taken along G-G in FIG. 17, of the hydrostatic transaxle according to the fourth embodiment of the present invention.
Figure 19:
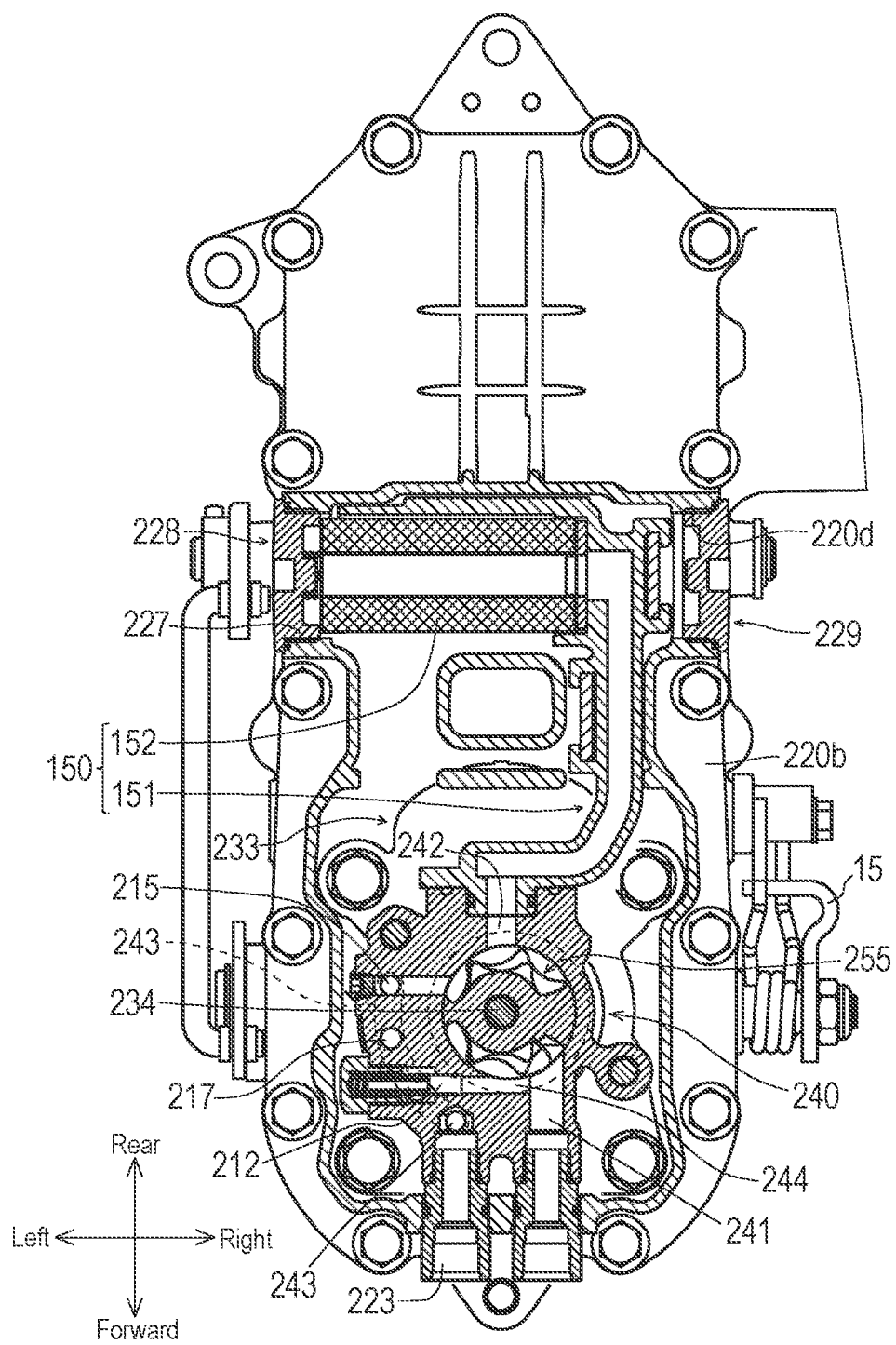
FIG. 19 is a cross-sectional view taken along G-G in FIG. 17, of the hydrostatic transaxle according to the fourth embodiment of the present invention.
Figure 20:
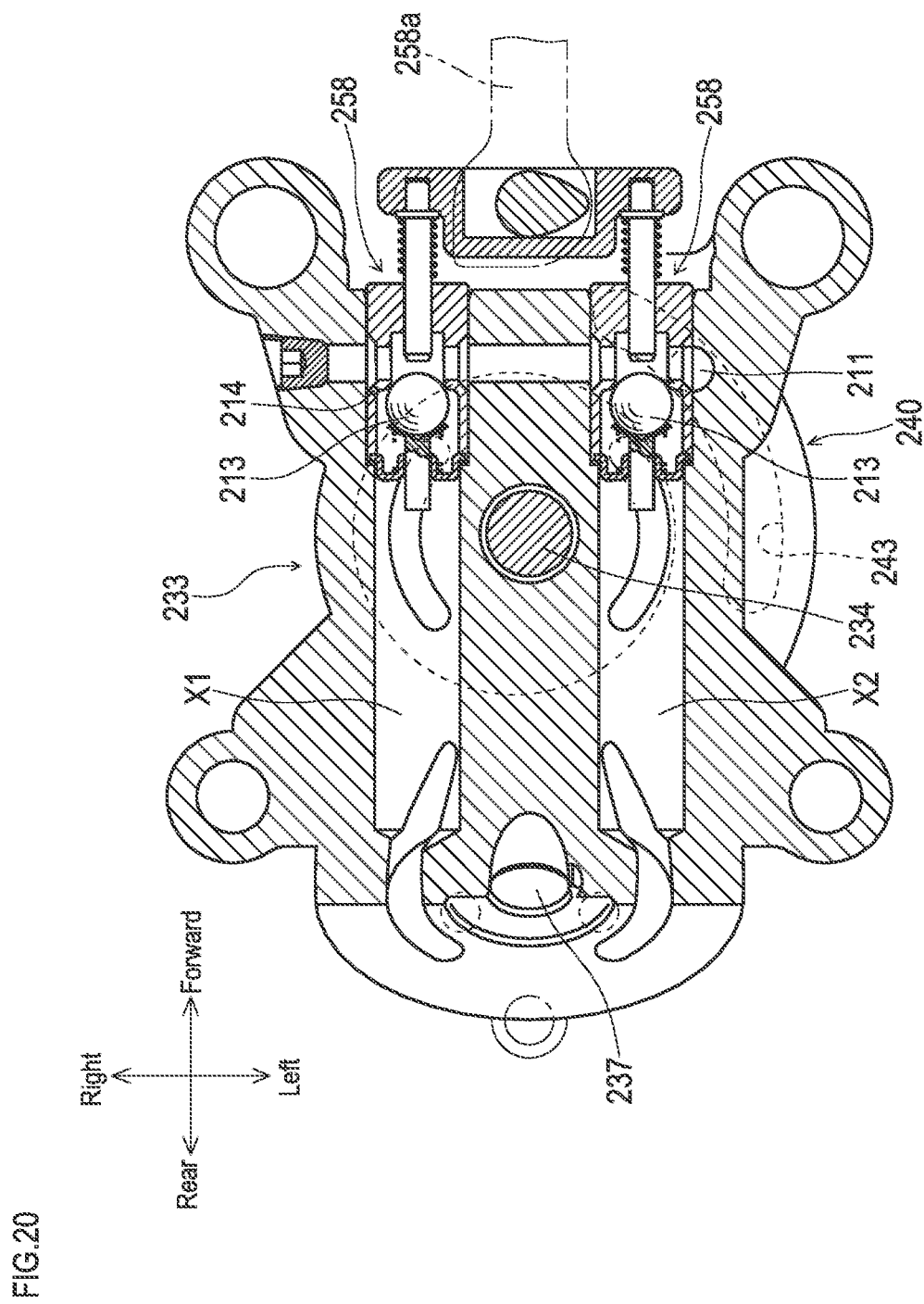
FIG. 20 is a cross-sectional view taken along H-H in FIG. 17, of the hydrostatic transaxle according to the fourth embodiment of the present invention.
Figure 21:
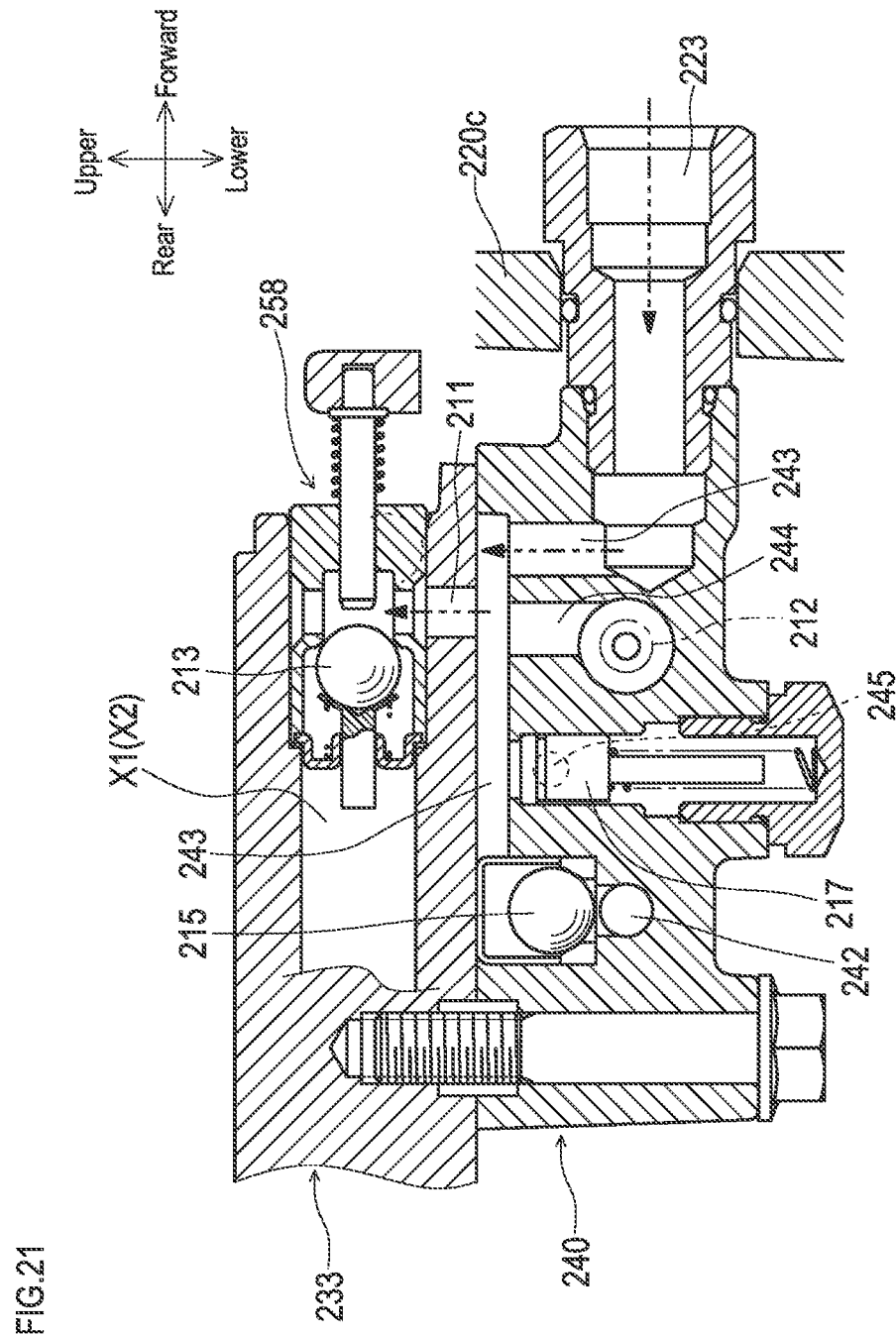
FIG. 21 is a cross-sectional view taken along K-K in FIG. 18, of the hydrostatic transaxle according to the fourth embodiment of the present invention.

The filter holding member 151 has a shape symmetrical in the forward and rear of the axis when flipped vertically around the axis of forward-rear direction so that the filter holding member 151 can be used either when the filter insertion hole 270 is arranged on the left side portion of the lower casing portion 220c as shown in FIG. 18 or when the filter insertion hole 270 is arranged on the right side portion of the lower casing portion 220c as shown in FIG. 19. A spare filter cap 229 is screwed into the spare hole 220d and sealed.

The HST 230 is configured by the hydraulic pump 231, the hydraulic motor 232, and the center section 233. The hydraulic pump 231 has the same configuration as the hydraulic pump 31 described above. Further, the hydraulic motor 232 has the same configuration as the hydraulic motor 32 described above.

The center section 233 fluidly connects the hydraulic pump 231 and the hydraulic motor 232 by oil passages X1, X2 (see FIG. 13) that are closed circuits drilled in the center section 233, and has substantially the same configuration as the center section 33 described above. Hereinafter, only the portions of the center section 233 that are different from those of the center section 33 will be described. The oil passages X1 and X2, which are closed circuits of the center section 233, include an oil suction port 211 for supplying the hydraulic oil.

The hydrostatic transaxle 210 includes a charge pump 255 and a charge pump casing 240 that covers the charge pump 255. The charge pump 255 is a pump configured to supply hydraulic oil to the oil suction port 211, and is driven by the rotation of the pump shaft 234 of the hydraulic pump 231. In the charge pump casing 240, a first oil passage 241, a second oil passage 242, a communication oil passage 243, a first relief oil passage 244, and a second relief oil passage 245 are formed. The charge pump casing 240 is coupled to the filter holding member 151 arranged along the inner wall of the lower casing part 220c.

The hydrostatic transaxle 210 is configured so that the hydraulic oil filtered by the filter body 152 is sucked by the charge pump 255 via the filter holding member 151 and the second oil passage 242 and the hydraulic oil pressurized by the charge pump 255 is discharged to the first oil passage 241. The communication oil passage 243 is connected to the oil suction port 211 and is configured so that the hydraulic oil supplied from the first oil passage 241 can flow into the oil suction port 211 via the communication oil passage 243.

The pressure of the oil discharged from the charge pump 255 is adjusted by the relief valve 212 in the first oil passage 241 and is sent to the oil suction port 211 via the communication oil passage 243. The hydraulic oil that has flowed into the oil suction port 211 is supplied to a closed circuit (low pressure side of the pair of oil passages X1, X2) between the hydraulic pump 231 and the hydraulic motor 232 of the HST 230 via charge check valves 213, 213. The relief oil from the relief valve 212 is returned to an oil reservoir 221.

In each of the casings 220, the charge check valve 213 for the oil passage X2 that is a high pressure side at the time of backward movement, is connected to the oil passage X2 in parallel to a neutral expansion oil passage via an orifice 214, and returns the pressurized oil in the oil passage X2 to the upstream side of the charge check valves 213, 213 via the orifice 214 at the time of backward movement.

When the upstream side of the charge check valves 213, 213 is connected to the oil reservoir 221 via a free wheel check valve 215, and the oil passage X1 or X2 has a negative pressure at the time the engine E is stopped, the free wheel check valve 215 opens to self-suction the oil in the oil reservoir 221 so that the inside of the closed circuit is always filled with oil. This free wheel check valve 215 is provided in order to avoid a situation where the hydraulic motor 232 rotates together with the rear wheel 4 at the time of parking on a slope.

A bypass mechanism 258 is disposed in each of the closed circuits in order to enable the hydraulic motor 232 to rotate together with the rear wheel 4 at the time of towing of the vehicle or the like. The bypass mechanism 258 is configured to make the charge check valve 213 switchable between a valve-opening position and a valve-closing position by manual operation (operation of a bypass lever 258a). The bypass mechanism 258 is forcibly set to the valve-opening position as necessary, so that the hydraulic oil is merged from the oil passages X1, X2 and is returned to the oil reservoir 221 of the casing 220. With such a configuration, pump action of the hydraulic motor 232 is permitted within the oil passages X1, X2, and the hydraulic motor 232 can rotate together with the rear wheel 4.

The hydrostatic transaxle 210 includes a pair of external ports 222 and 223. The external port 222 is a port that communicates with the first oil passage 241 communicating with the discharge port of the charge pump 255 and is capable of supplying hydraulic oil to an external hydraulic operating device 224 such as a mower lift device. As shown in FIG. 13, an external filter 225 may be provided in the oil passage between the external port 222 and the hydraulic operating device 224.

As shown in FIGS. 16 to 21, the external port 223, which is a port connected to the communication oil passage 243 connected to the oil suction port 211 located on the suction side of the charge pump 255, is for returning the hydraulic oil sent to the hydraulic operating device 224 to the closed circuits X1, X2. Further, in the hydrostatic transaxle 210, the relief valve 212 is provided on the first relief oil passage 244, which is an oil passage connecting the first oil passage 241 and the communication oil passage 243, and a charge relief valve 217 is provided on the second relief oil passage 245, which is an oil passage branched from the communication oil passage 243.

After the pressure is adjusted by the relief valve 212, the hydraulic oil discharged from the charge pump 255 to the first oil passage 241 is supplied to the hydraulic operating device 224 from the external port 222. When the relief valve 212 is opened, a part of the hydraulic oil in the first oil passage 241 is sent to the communication oil passage 243 via the relief valve 212.

Further, the hydraulic oil returned from the hydraulic operating device 224 is introduced into the communication oil passage 243 from the external port 223, and is returned to the closed circuits X1, X2 from the oil suction port 211 after the pressure is adjusted by the charge relief valve 217. When the charge relief valve 217 is opened, a part of the hydraulic oil in the communication oil passage 243 is discharged to the oil reservoir 221 through the charge relief valve 217.

As described above, in the hydrostatic transaxle 210, the first oil passage 241, the second oil passage 242, the communication oil passage 243, the first relief oil passage 244, and the second relief oil passage 245 are formed in the charge pump casing 240, the relief valve 212 is provided on the first relief oil passage 244, and the charge relief valve 217 is provided on the second relief oil passage 245. In the hydrostatic transaxle 210, the external port 222 connected to the first oil passage 241 and the external port 223 connected to the communication oil passage 243 are provided. The hydrostatic transaxle 210 having such a configuration is configured so that the external ports 222 and 223 also fit in the range of the accommodation space of the oil filter 150 in the height direction, and the hydrostatic transaxle 210 has the same compactness as that of the above-described hydrostatic transaxle 10 and a configuration capable of securing the ground clearance of the vehicle while being capable of supplying hydraulic oil to the external hydraulic operating device 224.

The hydrostatic transaxle 210 has a configuration that the filter insertion port 227 in the casing 220 is formed to face the left and right direction of the vehicle. In the hydrostatic transaxle 210, the external ports 222 and 223 are provided on the front surface that is a surface different from the side on which the filter insertion port 227 is formed. With this configuration, it is possible to easily insert and remove the filter body 152 with respect to the filter insertion port 227 during maintenance.

The hydrostatic transaxle 210 has a configuration that the filter holding member 151 extends rearward from the charge pump casing 240. The hydrostatic transaxle 210 has a configuration that the external ports 222 and 223 extend forward from the charge pump casing 240 in the direction opposite to the extension direction of the filter holding member 151. In the hydrostatic transaxle 210, since the distance between each of the external ports 222 and 223 and the filter insertion port 227 is sufficiently secured, a hydraulic piping for connecting the hydraulic operating device 224 to each of the external ports 222 and 223 is capable of being arranged so as not to obstruct insertion and extraction of the filter body 152 with respect to the filter insertion port 227.

The above description relates to specific embodiments according to the present invention, and various modifications are possible without departing from the spirit of the present invention. The appended claims are intended to cover such applications within the true scope and spirit of the present invention.

Accordingly, the embodiments disclosed in the present application are to be considered as illustrative and not to be considered as restrictive. The scope of the present invention is to be expressed in the following claims rather than the above description, and any change to the extent equivalent to the meaning of the scope of claims should be included in the scope of the present invention.

What is claimed is:

1. A hydrostatic transaxle comprising:
    a casing that is provided with an openable and closable filter insertion port on either of a left side wall or a right side wall of the casing and is filled with hydraulic oil;
    a hydraulic continuously variable transmission that is arranged inside the casing, the hydraulic continuously variable transmission including in combination a hydraulic pump, a hydraulic motor, and a center section provided with a closed circuit for fluidly connecting the hydraulic pump and the hydraulic motor, and including a port for charging the hydraulic oil in the closed circuit;
    a filter holding member that includes a support base that is a hollow cylindrical portion and oil-tightly partitions an inside of a cylinder and an outside of the cylinder, and a filter connection port that is a hollow cylindrical portion extending from a peripheral side surface of the support base and communicating with the inside of the cylinder, the support base communicating the inside of the cylinder to the port, and arranged between the center section and the casing facing the port, the filter connection port arranged so that a terminal end opening portion of the filter connection port faces the filter insertion port of the casing; and
    a filter body that is freely inserted to and removed from the casing via the filter insertion port, and is coupled to and held by the filter connection port when inserted to a predetermined position in the casing from the filter insertion port,
    wherein the filter body is arranged adjacent to the side wall opposite the side wall provided with the filter insertion port of the casing, and
    wherein the hydraulic motor is arranged between the hydraulic pump and an axle of the hydrostatic transaxle, the hydraulic motor being arranged so that a rotation axis of the hydraulic motor is perpendicular to a longitudinal direction of the axle in a plan view and is V-shaped with respect to the rotation axis of the hydraulic pump in a side view, and the filter body is located in a dead space between the hydraulic motor and the axle.

2. The hydrostatic transaxle according to claim 1, wherein the support base comprises a filter portion capable of filtering the hydraulic oil.

3. The hydrostatic transaxle according to claim 1, wherein the hydrostatic transaxle comprises a filter cap that enables opening and closing of the filter insertion port, and comprises, between the filter cap and the filter body, an energizing member that energizes the filter body to the filter connection port side.

4. The hydrostatic transaxle according to claim 1, further comprising a floating charge pump contained in the support base of the filter holding member.

5. The hydrostatic transaxle according to claim 1, wherein the casing comprises the axle driven by the hydraulic motor, and the filter insertion port is arranged in a side to which the axle does not project among both side walls of the casing.

6. A hydrostatic transaxle comprising:
    a casing that is provided with an openable and closable filter insertion port and is filled with hydraulic oil;
    a hydraulic continuously variable transmission that is arranged inside the casing, the hydraulic continuously variable transmission including in combination a hydraulic pump, a hydraulic motor, and a center section provided with a closed circuit for fluidly connecting the hydraulic pump and the hydraulic motor, and including a port for charging the hydraulic oil in the closed circuit;
    a filter holding member in which a filter connection port that is a hollow cylindrical portion is arranged so that a terminal end opening portion of the filter connection port faces the filter insertion port of the casing; and
    a filter body that is freely inserted to and removed from the casing via the filter insertion port, and is coupled to and held by the filter connection port when inserted to a predetermined position in the casing from the filter insertion port,
    wherein the hydraulic continuously variable transmission includes a charge pump for charging the hydraulic oil in the port of the closed circuit,
    wherein the casing includes a single axle driven by the hydraulic motor, and the filter insertion port is arranged in a side to which the axle does not project among both side walls of the casing,
    wherein the hydraulic motor is arranged between the pump and the axle, the hydraulic motor being arranged so that a rotation axis of the hydraulic motor is perpendicular to a longitudinal direction of the axle in a plan view and is V-shaped with respect to the rotation axis of the pump in a side view, and the filter body is located in a dead space between the motor and the axle, and
    wherein the filter holding member is arranged along an inner wall of the casing and connected to a suction side of the charge pump.

7. The hydrostatic transaxle according to claim 6, wherein the casing comprises:
    a pair of external port openings which are opened to the outside; and
    a first external port communicating with a discharge side of the charge pump and a second external port communicating with an oil suction side of the charge pump,
    wherein the first external port and the second external port communicate with an outside of the casing through the pair of external port openings, and wherein the first external port and the second external port are provided on a surface different from a surface on which the filter insertion port is provided in the casing.

8. A hydrostatic transaxle comprising:

a casing that is provided with an openable and closable filter insertion port and is filled with hydraulic oil;

a hydraulic continuously variable transmission that is arranged inside the casing, the hydraulic continuously variable transmission including in combination a hydraulic pump, a hydraulic motor, and a center section provided with a closed circuit for fluidly connecting the hydraulic pump and the hydraulic motor, and including a port for charging the hydraulic oil in the closed circuit;

a filter holding member that includes a support base that is a hollow cylindrical portion and oil-tightly partitions an inside of a cylinder and an outside of the cylinder, and a filter connection port that is a hollow cylindrical portion extending from a peripheral side surface of the support base and communicating with the inside of the cylinder, the support base communicating the inside of the cylinder to the port, and arranged between the center section and the casing facing the port, the filter connection port arranged so that a terminal end opening portion of the filter connection port faces the filter insertion port of the casing; and a filter body that is freely inserted to and removed from the casing via the filter insertion port, and is coupled to and held by the filter connection port when inserted to a predetermined position in the casing from the filter insertion port, wherein the hydraulic motor is arranged between the hydraulic pump and an axle of the hydrostatic transaxle, the hydraulic motor being arranged so that a rotation axis of the hydraulic motor is perpendicular to a longitudinal direction of the axle in a plan view and is V-shaped with respect to the rotation axis of the hydraulic pump in a side view, and the filter body is located in a dead space between the hydraulic motor and the axle.

* * * * *